(12) United States Patent
Hubbard et al.

(10) Patent No.: US 7,675,458 B2
(45) Date of Patent: Mar. 9, 2010

(54) DUAL BEAM RADAR SYSTEM

(75) Inventors: Oliver Hugh Hubbard, Waterloo (CA); Jian Wang, Waterloo (CA)

(73) Assignee: Raytheon Canada Limited, Ontario (CA)

( * ) Notice: Subject to any disclaimer, the term of this patent is extended or adjusted under 35 U.S.C. 154(b) by 112 days.

(21) Appl. No.: 11/760,188

(22) Filed: Jun. 8, 2007

(65) Prior Publication Data

US 2008/0111731 A1    May 15, 2008

Related U.S. Application Data

(60) Provisional application No. 60/857,784, filed on Nov. 9, 2006.

(51) Int. Cl.
*G01S 13/52* (2006.01)

(52) U.S. Cl. .............................. 342/159; 342/59; 342/93

(58) Field of Classification Search .................. 342/159
See application file for complete search history.

(56) References Cited

U.S. PATENT DOCUMENTS

| | | | |
|---|---|---|---|
| 3,603,998 A | 9/1971 | Kassel | |
| 3,618,087 A | 11/1971 | Smith et al. | |
| 3,701,989 A | 10/1972 | Calhoon, Sr. et al. | |
| 4,170,774 A | 10/1979 | Schaefer | |
| 4,404,561 A | 9/1983 | Mulder et al. | |
| 4,649,388 A * | 3/1987 | Atlas | 342/26 D |
| 4,649,389 A * | 3/1987 | Taylor et al. | 342/123 |
| 4,649,390 A | 3/1987 | Andrews et al. | |
| RE33,152 E | 1/1990 | Atlas | |
| 4,961,075 A | 10/1990 | Ward | |
| 4,963,888 A * | 10/1990 | Taylor et al. | 342/90 |
| 5,093,662 A | 3/1992 | Weber | |
| 5,202,691 A | 4/1993 | Hicks | |
| 5,374,932 A | 12/1994 | Wyschogrod et al. | |
| 5,414,643 A | 5/1995 | Blackman et al. | |
| 5,568,151 A | 10/1996 | Merritt | |
| 5,594,450 A * | 1/1997 | Schober | 342/159 |
| 5,648,782 A | 7/1997 | Albo et al. | |
| 5,909,189 A | 6/1999 | Blackman et al. | |

(Continued)

FOREIGN PATENT DOCUMENTS

EP    0 132 232 A2    1/1985

(Continued)

OTHER PUBLICATIONS

Gandhi et al. "Analysis of CFAR Processors in Nonhomogeneous Background". IEEE Transactions on Aerospace and Electronic Systems. vol. 24. Jul. 1998. pp. 427-445.*

(Continued)

*Primary Examiner*—Thomas H Tarcza
*Assistant Examiner*—Matthew M Barker
(74) *Attorney, Agent, or Firm*—Daly, Crowley, Mofford & Durkee, LLP

(57) ABSTRACT

Various embodiments are described herein relating to a radar system and associated methods for detecting targets in the presence of certain types of clutter. The radar system generally comprises hardware operatively configured to obtain first and second sets of radar return signals concurrently, first circuitry operatively configured to detect targets in the first and second sets of radar return signals, and second circuitry operatively configured to identify detected targets due to clutter.

28 Claims, 5 Drawing Sheets

U.S. PATENT DOCUMENTS

| | | | |
|---|---|---|---|
| 5,982,320 | A | 11/1999 | Simpson et al. |
| 6,130,638 | A | 10/2000 | Winter et al. |
| 6,243,037 | B1 | 6/2001 | Pulford et al. |
| 6,260,759 | B1 | 7/2001 | Nguyen et al. |
| 6,278,401 | B1 | 8/2001 | Wigren |
| 6,292,136 | B1 | 9/2001 | Egnell |
| 6,307,500 | B1 * | 10/2001 | Cornman et al. ........... 342/26 R |
| 6,377,204 | B1 | 4/2002 | Wurman et al. |
| 6,420,997 | B1 | 7/2002 | Cong |
| 6,567,037 | B1 | 5/2003 | Fung et al. |
| 6,618,324 | B1 | 9/2003 | Lane |
| 6,677,886 | B1 * | 1/2004 | Lok .......................... 342/26 R |
| 6,704,692 | B1 | 3/2004 | Banerjee et al. |
| 6,771,207 | B1 * | 8/2004 | Lang ......................... 342/26 R |
| 6,819,285 | B1 | 11/2004 | Stockman et al. |
| 6,888,493 | B2 | 5/2005 | Driessen et al. |
| 6,993,460 | B2 | 1/2006 | Beadle et al. |
| 7,026,979 | B2 | 4/2006 | Khosla |
| 7,030,809 | B2 | 4/2006 | McCabe et al. |
| 7,095,358 | B2 | 8/2006 | Krikorian et al. |
| 7,193,557 | B1 | 3/2007 | Kovacich et al. |
| 7,218,270 | B1 | 5/2007 | Tamburino |
| 7,333,052 | B2 | 2/2008 | Maskell |
| 7,499,571 | B1 | 3/2009 | Han et al. |
| 2004/0075605 | A1 * | 4/2004 | Bradford et al. ............... 342/95 |
| 2005/0195104 | A1 * | 9/2005 | Liebscher et al. ........... 342/191 |
| 2007/0024494 | A1 * | 2/2007 | Dizaji et al. .................. 342/90 |
| 2008/0111730 | A1 | 5/2008 | Ding |

FOREIGN PATENT DOCUMENTS

| | | |
|---|---|---|
| EP | 0 132 232 B1 | 1/1985 |
| WO | WO 98/21603 A1 | 5/1998 |
| WO | WO 2006/035041 A1 | 4/2006 |

OTHER PUBLICATIONS

Cai et al.; "EM-ML Algorithm for Track Initialization using Possibly Noninformative Data;" IEEE Transactions on Aerospace and Electronic Systems; vol. 41, No. 3, Jul. 2005; pp. 1030-1048.

Ding et al.: "Track Quality Based Multitarget Tracking Algorithm;" slides presented at SPIE Conference on Signal Small Targets, Orlando, FL; Apr. 19, 2006; 17 pages.

Ristic; "A Comparison of MHT and 2D Assignment Algorithm for Tracking with an Airborne Pulse Doppler Radar;" $5^{th}$ Int'l Symposium on Signal Processing and its Applications; ISSPA '99, Brisbane, Australia; Aug. 22-25, 1999; pp. 341-344.

Sinha et al.; "Track Quality Based Multitarget Tracking Algorithm;" SPIE Conference on Signal and Data Processing of Small Targets (#6236-08), Orlando, FL; Apr. 2006; 12 pages.

Ding et al.: "A Track Quality Based Multi-Target Tracker;" U.S. Appl. No. 11/756,913, filed Jun. 1, 2007; 37 pages.

"Alaska Wind Turbine Study—Phase 2", Raytheon document, Mar. 2006, 29 pages.

"Wind Turbines and Radar: Operational Experience and Mitigation Measures", Report to a consortium of wind energy companies, Dec. 2001, Spaven Consulting 2001, 39 pages.

"The Effects of Wind Turbine Farms on ATC Radar", Open Report, AWC/WAD/72/665/TRIALS, May 10, 2005, 44 pages.

"Feasibility of Mitigating the Effects Of Windfarms on Primary Radar", ETSU W/14/00623/REP, DTI PBU URN No. 03/976; Contractor, Alenia Marconi Systems Limited, Prepared by MM. Butler, D.A. Johnson, First Published in Jun. 2003.

"Feasibility of Mitigating The Effects of Windfarms on Primary Radar", Project Summary W/14/00623, Jun. 2003, 4 pages.

Report to the Congressional Defense Committees, "The effect on Windmill Farms on Military Readiness", Office of the Director of Defense Research and Engineering, Jan. 2006, 62 pages.

Bar-Shalom; "Multitarget-Multisensor Tracking: Principles and Techniques," Lecture Notes; Dept. of Electrical and Systems Engineering, University of Connecticut; Jan. 1995; 622 pages.

Bar-Shalom et al; "Automatic Track Formation in Clutter With a Recursive Algorighn;" Proceedings on the $28^{th}$ Conference on Decision and Control; Dec. 1989; pp. 1402-1408.

Bertsekas; The Auction Algorithn 2-D Assignment, Linear Network Optimization, Algorighms and Codes; MIT Press; Cambridge, MA; Jan. 1991; 186 pages.

Li et al; Target Perceivability and Its Applications; IEEE Transactions on Signal Processing; vol. 49, No. 11; Nov. 2001; pp. 2588-2604.

Yeom et al.; Track Segment Association, Fine-Step IMM and Initialization with Doppler for Improved Track Performance; IEEE Transactions on Aerospace and Electronic Systems; vol. 40, No. 1; Jan. 2004; pp. 293-309.

* cited by examiner

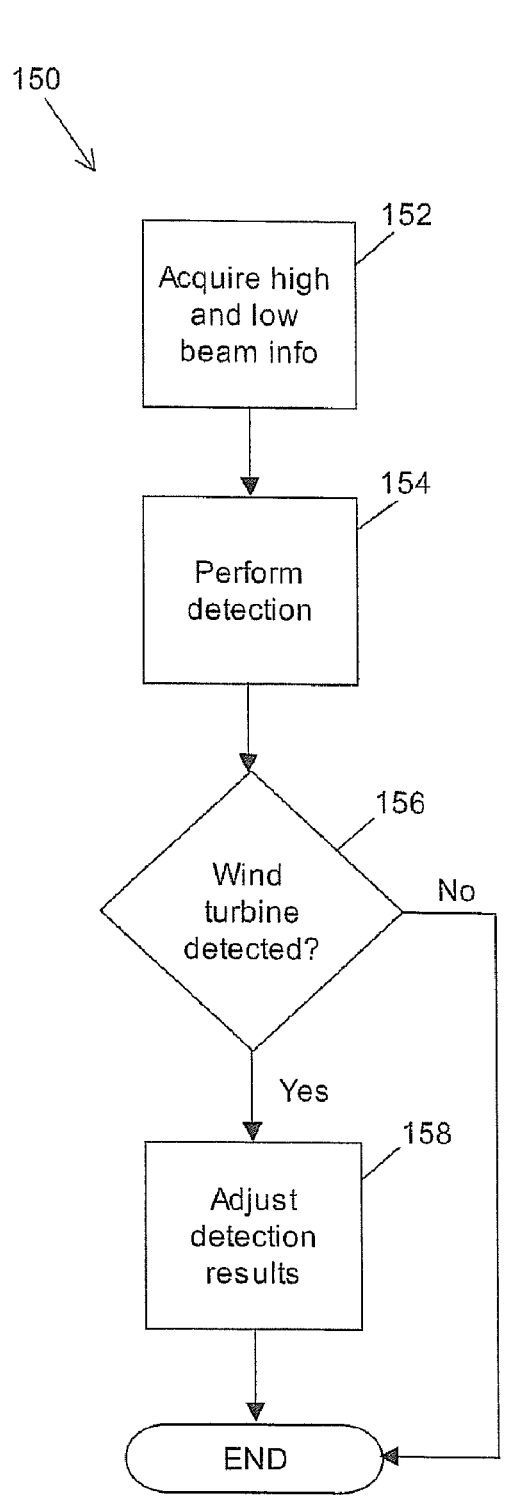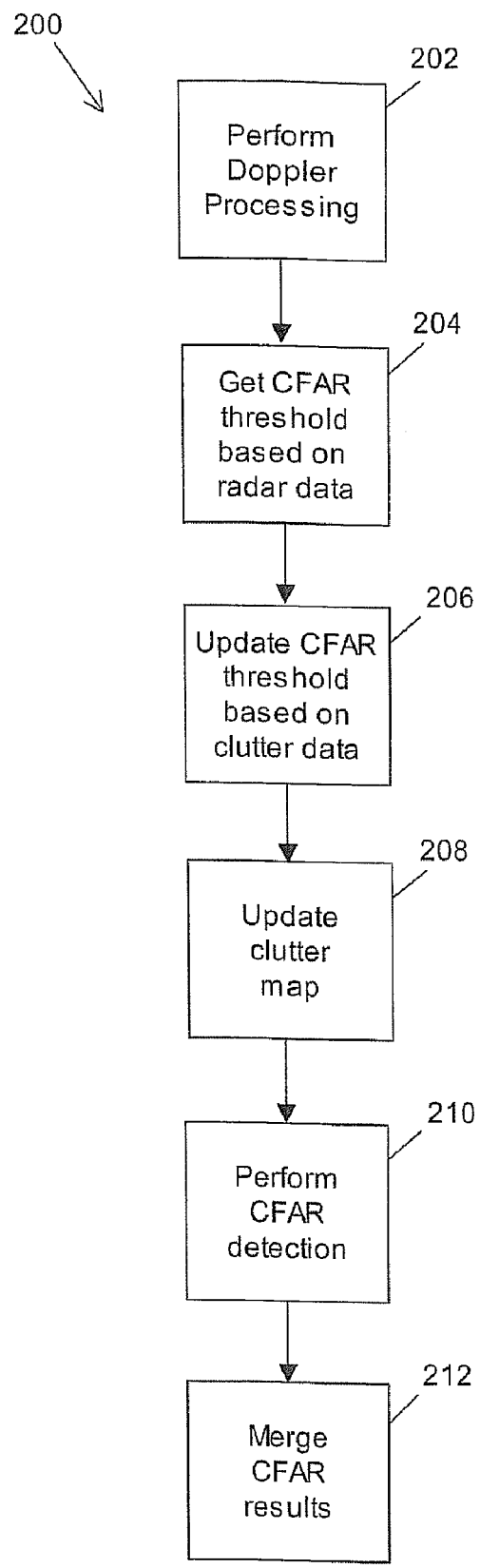
FIG. 5
FIG. 6 ic # DUAL BEAM RADAR SYSTEM

CROSS REFERENCE TO RELATED APPLICATIONS

This application claims the benefit under 35 U.S.C. §119(e) of Provisional application No. 60/857,784 filed Nov. 9, 2006 which application is incorporated herein by reference in its entirety.

FIELD

Embodiments are described herein for a dual beam radar system that can be used to discriminate between airborne targets and land-based clutter.

BACKGROUND

Generally, there are two types of radars that are used in a civil Air Traffic Control (ATC) radar system: a Primary Surveillance Radar (PSR) and a Secondary Surveillance Radar (SSR). The PSR transmits pulses and reports the range and azimuth of all detected objects in a given surveillance area. The detected objects include both aircraft and non-aircraft objects. The SSR transmits interrogation signals to aircrafts in the given surveillance area and receives information from the aircrafts that have operational transponders that respond to the interrogation signals. The information includes the range, azimuth, identity and height of all aircrafts that reply to the interrogation signals.

However, some aircrafts, such as hijacked or enemy aircrafts, may deliberately turn off their transponders. Other aircrafts may have a damaged transponder. Furthermore, non-aircraft airborne objects, such as birds, cannot respond to the interrogation signals. As a result conventional civil ATC radar systems cannot determine the height of these non-aircraft objects or aircrafts that do not respond to the SSR interrogation pulses, which can be a serious problem. For example, in the United States, there were over 6,000 reported collisions between aircrafts and birds in 2004. Most of these collisions occurred near airports at low elevations in the glide path where aircrafts were either landing or taking off. This is also the area in which aircraft are most vulnerable to collisions.

Furthermore, in the past decade many countries, including the UK, the Netherlands, Germany and the USA have launched programs to deploy wind turbines as an alternative, environmentally friendly source of electrical energy. However, this has raised many concerns from ATC and military authorities since radar returns from wind turbines have the potential to distract and confuse air traffic controllers and can effectively mask genuine aircraft returns in the vicinity of the wind farm.

In fact, the presence of wind farms within the field of view of primary surveillance radars presents a considerable design challenge. Echoes originating from these structures may have similar characteristics to those of an aircraft and may be significantly stronger in amplitude. The overall effect of wind turbines are three fold: 1) the echoes (i.e. radar return signals) due to wind turbines may dominate and mask those originating from an aircraft resulting in a "radar blind zone" and missed detections, 2) the aircraft track may be seduced away from its correct path due to miss-association with an echo originating from a wind turbine, and 3) echoes originating from a wind farm may result in the generation of a high rate of false reports in the vicinity of the wind farm.

For instance, very large wind turbines have a Radar Cross Section (RCS) of up to 25 dBsm on average and in some cases even as high as 50 dBsm, whereas the typical RCS of a commercial aircraft during approach (i.e. when landing) ranges from 3 dBsm to 10 dBsm. In addition, the Doppler frequencies of the radar returns from the rotating blades of a wind turbine are similar to the Doppler frequencies of an approaching aircraft (an example is 1671 Hz at a frequency of 2,800 MHz which corresponds to a velocity of 174 knots while the approach speed of a commercial aircraft is about 150 knots). Thus, radar returns from wind turbines have similar Doppler characteristics and larger RCS than aircraft and can completely mask a radar return from an aircraft virtually making it "invisible" to a radar system when in the vicinity of a wind farm. In fact, wind farm regions result in a 16% to 22% lower probability of detection of aircraft by a civil ATC radar system than in adjacent non-wind farm regions.

SUMMARY OF THE INVENTION

In accordance with the present invention, a method of processing radar data includes obtaining first and second sets of radar return signals concurrently, detecting targets in the first and second sets of radar return signals and identifying detected targets due to clutter. In one embodiment, first and second sets of radar return signals are concurrently obtained and an independent, concurrent low and high beam channel processing technique is used to provide a method of processing radar data to discriminate between airborne objects and clutter (e.g. wind turbines) in a surveillance area is provided. In one embodiment, a primary surveillance radar (PSR) locates and tracks objects within the surveillance area of the radar system by transmitting pulses along a low beam direction and concurrently using both a low beam and a high beam to receive radar return signals and concurrently processing return signals from objects in the surveillance area in high and low beam reception channels by beamforming each of the receiving beams to high and low directions. Such concurrent processing enables the technique to discriminate between airborne objects (e.g. aircraft) and clutter (e.g. wind turbines) in the surveillance area. In particular, in one embodiment, a data combiner and a calibrator can provide information on targets and clutter that are detected by at least one of the beams, by using data provided by the PSR, a height estimation lookup table, and in some cases a secondary surveillance radar.

A radar system includes hardware operatively configured to obtain first and second sets of radar return signals concurrently, first circuitry operatively configured to detect targets in the first and second sets of radar return signals and second circuitry operatively configured to identify detected targets due to clutter. With this particular arrangement, a radar system which discriminates between signal returns from aircraft and wind turbines is provided. By implementing independent, concurrent low and high beam channel processing, comparing detection information obtained for both beams, and retaining information regarding the beam in which detection occurs as well as possibly the beam in which significant clutter is detected, the radar system provided and utilizes information which can be used to help discriminate between aircraft and wind turbines. Information from both beams can be combined at various points including: 1) combining information from the beams at the radio frequency (RF) stage; 2) combining information from the beams after pulse compression; 3) combining information from the beams at the input to a binary integrator; 4) combining information from the beams at an input to a plot extractor; and 5) combining information from the beams at or after a primary surveillance radar/secondary surveillance radar (PSR/SSR) data combiner. In one exemplary embodiment, information from the beams is combined at a PSR data processor, but there are other possibilities.

In one embodiment, a primary surveillance radar (PSR) locates and tracks objects within the surveillance area of the radar system by transmitting a low beam and concurrently processing return signals from objects in the surveillance area in high and low beam reception channels by beamforming each of the receiving beams to high and low directions. The concurrent processing enables the radar system to discriminate between airborne objects and clutter in the surveillance area. More particularly, a data combiner and calibrator can provide information on targets and clutter that are detected by at least one of the beams, by using data provided by the PSR, the height estimation lookup table, and in some cases the SSR.

In accordance with a further aspect of the present invention, a computer readable medium having program code stored thereon which when for use in processing radar data, which when executable by a processor for implementing a method of processing radar data including obtaining first and second sets of radar return signals concurrently, detecting targets in the first and second sets of radar return signals and identifying detected targets due to clutter. By obtaining first and second sets of radar return signals concurrently and implementing independent, concurrent low and high beam channel processing, a method of processing radar data to discriminate between airborne objects and clutter (e.g. wind turbines) in a surveillance area is provided. In one embodiment, a primary surveillance radar (PSR) locates and tracks objects within the surveillance area of the radar system by transmitting pulses along a low beam direction and concurrently using both a low beam and a high beam to receive radar return signals and concurrently processing return signals from objects in the surveillance area in high and low beam reception channels by beamforming each of the receiving beams to high and low directions. Such concurrent processing enables the technique to discriminate between airborne objects (e.g. aircraft) and clutter (e.g. wind turbines) in the surveillance area. In particular, in one embodiment, a data combiner and a calibrator can provide information on targets and clutter that are detected by at least one of the beams, by using data provided by the PSR, a height estimation lookup table, and in some cases a secondary surveillance radar.

BRIEF DESCRIPTION OF THE DRAWINGS

For a better understanding of the various embodiments described herein, and to show more clearly how it may be carried into effect, reference will now be made, by way of example only, to the accompanying drawings in which:

FIG. 5 is a flowchart diagram illustrating an exemplary embodiment of a radar data processing method for mitigating the effects of wind turbines;

FIG. 6 is a flowchart diagram illustrating a radar detection method that can be employed by the radar data processing method of FIG. 5.

DETAILED DESCRIPTION OF THE EMBODIMENTS

Figure 1:
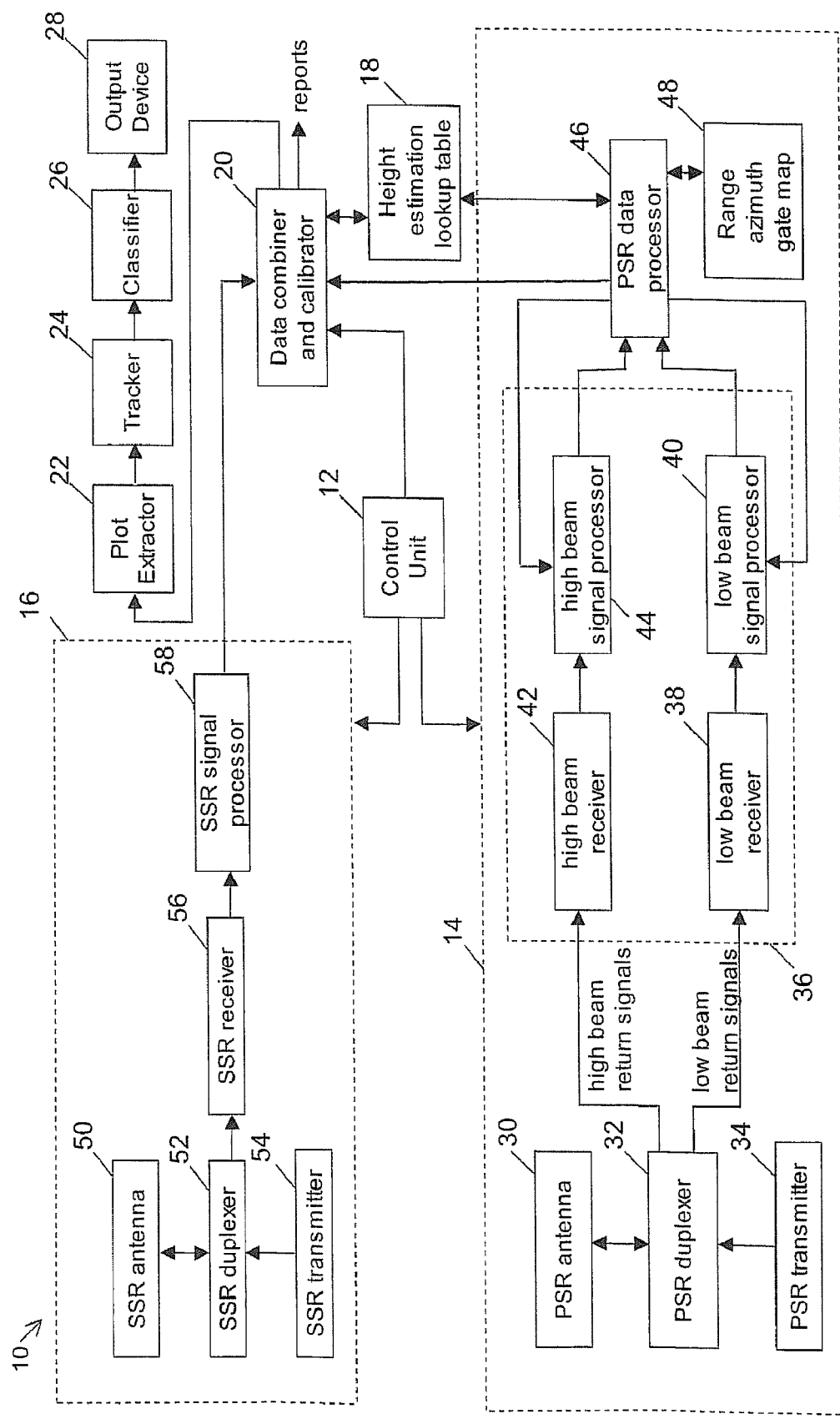
FIG. 1 is a block diagram of an exemplary embodiment of a portion of a civil ATC radar system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

Generally, in an ATC radar system, tracks generated based on PSR data can be combined with tracks generated based on SSR data in a tracker. Since the SSR provides more accurate positional data, typically the data from this source can be used to represent the combination of PSR and SSR data. Furthermore, SSR data encodes an identification number for each aircraft allowing for automatic association among SSR-based plots. As such, with the presence of SSR data, tracking over wind farms can be simplified. However, in the absence of SSR data, tracking over wind farms becomes difficult. In fact, wind farm regions result in a 16% to 22% lower probability of detection of aircraft by a PSR than in adjacent non-wind farm regions. Thus, for aircraft that do not transmit SSR information, tracks over wind farm regions can become disjointed or seduced by wind farm clutter. The absence of SSR data can be attributed to aircraft lacking a working SSR transmitter, or its deliberate or accidental disablement. Many smaller aircraft fall into this category due to the lack of an actual transmitter unit. However, the radar system described herein uses primary radar data in target detection and tracking, although SSR data can still be used in calibration as described in more detail below.

In general, possible solutions to mitigate the effect of wind turbines fall within three groups. One group of possible solutions is based on changing the environment in which the radar operates. This includes changing characteristics of the wind turbines themselves (particularly reducing its radar cross section), screening wind turbines and changing the path between the radar and the wind turbines. Another group of possible solutions is based on changing air traffic handling procedures in the vicinity of wind turbines. This includes changing air traffic routes to avoid areas of the wind turbines and the methods of handling air traffic in the vicinity of the wind turbines. Another group of possible solutions is based on changing radar signal processing algorithms prior to detection, at the stage of detection and at post detection (i.e. plot extraction and tracking).

Referring now to FIG. 1, shown therein is a block diagram of an exemplary embodiment of a portion of a civil ATC radar system 10. The radar system 10 can estimate the azimuth, range and height of a target for a range of elevation angles in its surveillance area and mitigate the effect of clutter due to various objects such as birds and wind turbines. The radar system 10 implements independent concurrent low and high beam channel processing, compares detection information obtained for both beams, and retains information regarding the beam in which detection occurs as well as possibly the beam in which significant clutter is detected. This information is used to help discriminate between aircraft and wind turbines. Information from both beams can be combined at various points including: 1) combining information from the beams at the RF stage (not shown); 2) combining information from the beams after pulse compression; 3) combining information from the beams at the input to the binary integrator; 4) combining information from the beams at the input to the plot extractor; and 5) combining information from the beams at or after the PSR/SSR data combiner. In this exemplary embodiment, information from the beams is combined at a PSR data processor, but there are other possibilities.

Since wind turbines and aircrafts are objects with differences in altitudes, a preliminary distinction between aircrafts and wind turbines can be based on a difference in the altitudes of these objects by using two independent concurrent low and high beam receiver channels. Discrimination between aircrafts and wind turbines can be further improved by selective use of detection thresholds per individual radar data sets provided by separate Doppler filters in a Doppler filter bank. Discrimination between aircraft and wind turbines can also be improved by improving the data association algorithm when generating tracks. This can also include using classification algorithms that uniquely represent the behavior of aircrafts and clutter originated by wind farms or bird migrations.

The civil ATC radar system 10 generally includes a control unit 12, a PSR 14, an SSR 16, a height estimation lookup table 18, a data combiner and calibrator 20, a plot extractor 22, a tracker 24, a classifier 26, and an output device 28. In alternative embodiments, the radar system 10 may include additional components not shown in FIG. 1, may not include all of the components shown in FIG. 1, and/or may have a different configuration than that shown in FIG. 1. For example, the classifier 26 may be additionally, or optionally, connected to at least one of the data combiner and calibrator 20 and the plot extractor 22 to classify detected targets. This allows target classification to be done at various stages of target tracking including during or after detection, plot extraction or track formation. There can also be an input module (not shown) that can be used by an operator to provide an additional level of control to the radar system 10.

The control unit 12 controls the operation of the civil ATC radar system 10 and although connections are shown only to the PSR 14, the SSR 16 and the data combiner and calibrator 20, it is understood that the control unit 12 can provide control signals to other components of the radar system 10. The PSR 14 locates and tracks objects within the surveillance area of the radar system 10 by transmitting a low beam and concurrently processing return signals from objects in the surveillance area in high and low beam reception channels by beamforming each of the receiving beams to high and low directions as will be described in more detail with respect to FIG. 3. The concurrent processing enables the radar system 10 to discriminate between airborne objects and clutter in the surveillance area. More particularly, the data combiner and calibrator 20 can provide information on targets and clutter that are detected by at least one of the beams, by using data provided by the PSR 14, the height estimation lookup table 18, and in some cases the SSR 16 as will be described in more detail below.

The data combiner and calibrator 20 can generate and maintain the height estimation lookup table 18 by using calibration data provided by known objects. In this exemplary embodiment, the PSR 14 and the SSR 16 can provide the calibration data. In other embodiments, devices other than the SSR 16 can provide the calibration data, such as an ADS-B (or UAT or VDL Mode 4) device (not shown), which takes advantage of GPS and data link technology to autonomously transmit real-time aircraft position (including altitude) to both ground based stations for air traffic control as well as to appropriately equipped aircraft. The SSR 16, the ADS-B device and any other device that can be used to provide known height calibration data are referred to herein as a height calibration data provision device. Calibration is discussed in more detail below. Alternatively, or in addition, a test target or a co-operating airplane may be used.

The PSR 14 includes a PSR antenna 30, a PSR duplexer 32, a PSR transmitter 34, and a PSR receiver 36. The PSR receiver 36 can include a low beam signal processing path that includes a low beam receiver 38, and a low beam signal processor 40, and a high beam signal processing path that includes a high beam receiver 42, and a high beam signal processor 44. The PSR 14 further includes a PSR data processor 46. The PSR data processor 46 interacts with a range azimuth gate map 48 that is stored in a data store (not shown) that can be accessed by the PSR 14. Alternatively, the functionality of the low beam and high beam signal processors 40 and 44 and the PSR data processor 46 can be provided by an advanced digital signal processor.

The PSR antenna 30 can be a scanning antenna, a phased array antenna, or any other suitable antenna. The PSR transmitter 34 can be a solid-state transmitter, a tube transmitter, or any other suitable transmitter. Various waveforms can be used for generating the transmitted radar pulses such as simple unmodulated waveforms, modulated complex waveforms such as nonlinear FM waveforms as well as other suitable waveforms transmitted in a simplex frequency, dual frequency or other suitable fashion as is commonly known by those skilled in the art. A variable pulse repetition frequency (PRF) may also be used across different coherent processing intervals (CPIs) to combat the blind speed problem. However, a constant PRF across different CPIs can also be used.

In use, the control unit 12 controls the operation of the PSR 14 and can provide timing control signals to the PSR duplexer 32, the PSR transmitter 34, and the PSR receiver 36 to control the timing of the transmission and reception of signals. The PSR transmitter 34 can be configured to create the radar pulse signals that are to be transmitted and amplify these signals to a higher power level to provide adequate range coverage. The PSR receiver 36 is sensitive to the range of frequencies being transmitted and provides amplification for received radar return signals. The PSR duplexer 32 is a switch that connects either the PSR transmitter 34 or the PSR receiver 36 to the PSR antenna 30 depending on whether signals are to be transmitted or received, respectively, and to protect the receiver 36 from the high power output of the PSR transmitter 34. These elements are well known to those skilled in the art.

During the transmission of an outgoing pulse, the PSR duplexer 32 couples the PSR transmitter 34 to the PSR antenna 30 for the duration of the pulse. After the pulse has been transmitted, the PSR duplexer 32 couples the PSR antenna 30 to the PSR receiver 36. The PSR 14 transmits electromagnetic energy in a given sector of the surveillance area according to a beam pattern. In some cases, the PSR antenna 30 can rotate to direct the beam pattern, as well as detect radar return signals from objects, along different sectors in the surveillance area. In other cases, electronic beamforming can be used to scan different areas of the surveillance area, as is commonly known to those skilled in the art.

Figure 3:
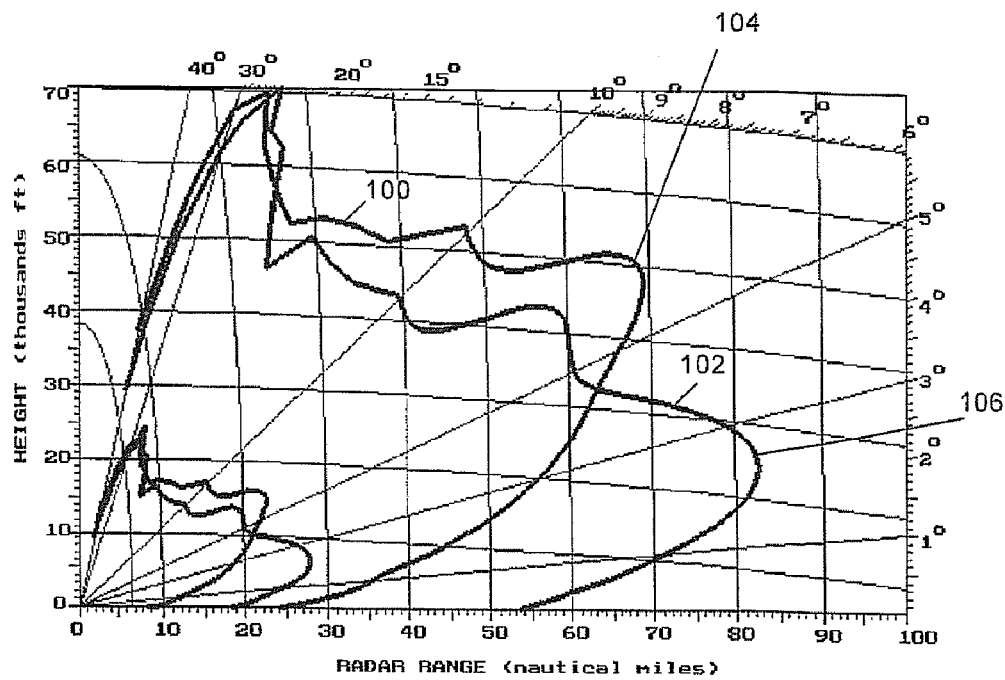
FIG. 3 is a plot showing exemplary patterns for high and low receive beams that can be used by the civil ATC radar system of FIG. 1 to receive radar return signals.

The PSR 14 of the radar system 10 transmits pulses along a low beam direction and concurrently uses both a low beam and a high beam to receive radar return signals. Referring now to FIG. 3, shown therein is a plot of exemplary patterns for a high beam 100 and a low beam 102 that can be used by the PSR 14. The high beam 100 has a high beam axis 104 and the low beam 102 has a low beam axis 106. There is an offset of about 5 degrees between the high beam axis 104 and the low beam axis 106. The high and low beams 100 and 102 have a cosecant beam pattern as shown in FIG. 3. In alternative embodiments pencil or fan beams can be used. However, other beam patterns can be employed as well as other offsets between the high beam axis 104 and the low beam axis 106, as long as a stable delta gain pattern results, which is discussed in relation to FIG. 4. For instance, the gain of the high and low beams 100 and 102 can be varied during antenna manufacture by shifting the High beam horn alignment (relative to the Low Beam horn) to extend the overlap region by three to nine degrees in some cases.

Figure 4:
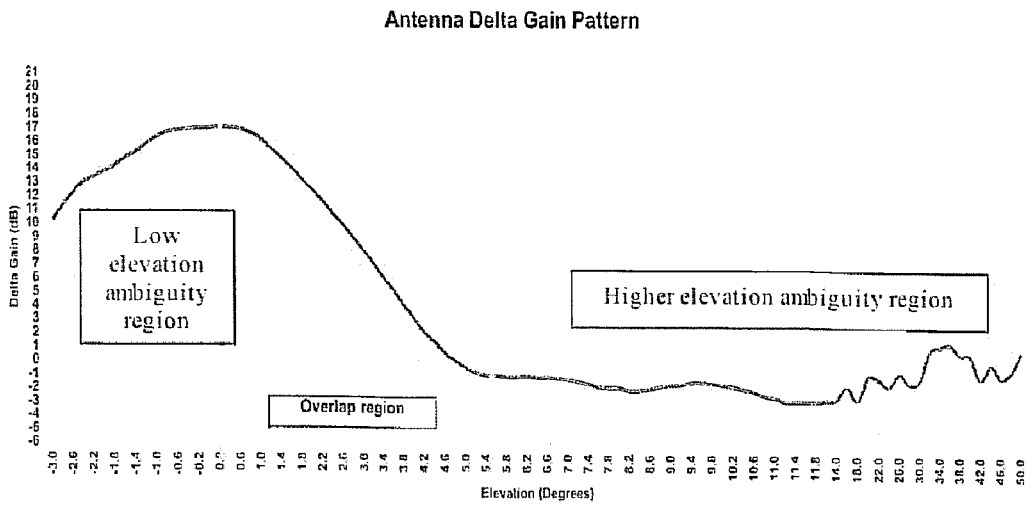
FIG. 4 is a plot of an antenna delta gain pattern over a range of elevation angles that correspond to the high and low receive beams of FIG. 3.

Referring now to FIG. 4, shown therein is a plot of an antenna delta gain pattern over a range of elevation angles that corresponds to the high and low beams 100 and 102 of FIG. 3. The delta gain pattern is a plot of delta gain (in dB) versus elevation angle (in degrees). The delta gain is the difference in gain (i.e. amplitude) between a radar return signal from a target detected by the low beam 102 (hereafter referred to as a low beam return signal), and a radar return signal from the same target detected by the high beam 100 (hereafter referred to as a high beam return signal). The delta gain can be calculated as follows:

$$\text{Delta Gain (dB)} = \text{Low Beam Return Signal Amplitude (dB)} - \text{High Beam Return Signal Amplitude (dB)} \qquad (1)$$

An offset value can be added to equation 1 to ensure that the delta gain values that are calculated are positive.

Experimentation has shown that there is a stable correspondence between the delta gain and elevation angle in the overlap region of the high beam 100 and the low beam 102. In this region there is a gain variation of about 18 dB and an elevation angle variation from about 0.6 to 5.8 degrees. The elevation angle corresponds to the height of the target, i.e. the height of the target can be estimated by multiplying the range of the object by the sine of the elevation angle. Furthermore, the range of values of the elevation angle in the overlap region corresponds to the glide path of civil aircraft; typically the angle of ascent or descent for a civil aircraft is about 2.5 degrees. For the civil aircraft market, this region close to the ground is where the biggest risk exists for aircraft that are taking off and landing.

The radar system 10 can provide a preliminary detection of targets in the glide path of an aircraft by using the high and low beams 100 and 102, and the delta gain pattern. When a target is detected, based on the estimated height, a preliminary decision can be made as to whether the target is an airborne target, or is clutter that may be ground-based. Further processing can then be done to confirm the type of detected target and information can be fed back to the PSR receiver 36 to adjust data processing for improving detection of airborne targets. Once, airborne targets are identified then depending on the particular scenario, an air traffic controller can provide flight pattern incursion information to aircraft that are landing or taking off. This is in contrast to a conventional ATC system that cannot provide height information for all objects in the glide path or cannot identify ground-based clutter due to wind turbines; in this conventional case, the airport is shutdown if objects are detected by the PSR and the height is unknown (this can be a big problem during bird migration).

On either side of the overlap region, there is a lower elevation ambiguity region and a higher elevation ambiguity region. The upper limit of the overlap region is defined by the beam axis 104 of the high beam 100. The lower limit of the overlap region is defined by the beam axis 106 of the low beam 102. The low elevation ambiguity region is caused by the leveling off or differing decay of residual gains in the high and low beam gains. This causes a fold over or leveling off of the gain delta pattern creating the potential for two elevation angles to have the same gain delta. This lower elevation ambiguity region can be eliminated by setting a suitable tilt angle for the PSR antenna 30 so that the elevation angles associated with the low elevation ambiguity region are negative and correspond to a certain depth below the ground. Accordingly, if a delta gain value of 13 dB is calculated, this corresponds to an elevation of 1.8 degrees since based on the delta gain pattern the other instance of 13 dB is in the low elevation ambiguity region which has a negative elevation angle.

The high elevation ambiguity region is also caused by the leveling off or differing decay of residual gains in the high and low beam gains. This causes a fold over or leveling off of the gain delta pattern creating the potential for two elevation angles to have the same gain delta. This higher elevation ambiguity region can be mitigated by providing a minimum range for height estimation; i.e. height estimation can be done if the detected object is more than a certain distance away from the radar site. This distance can be based on the maximum operational height of targets in the radar's vicinity. For example, if local operations are restricted to traffic only below 18,000 feet then a three nautical mile minimum limit may be applied to height estimation. Alternatively, track velocity can be used as additional criteria to resolve the ambiguity. For instance, if the detected object is moving fast, it can be assumed to be higher in elevation, and if the detected object is moving slow, it can be assumed to be lower in elevation. This is inline with current practice for trackers handling objects of unknown altitude.

Referring once again to FIG. 1, low beam return signals are processed by the low beam receiver 38 and the low beam signal processor 40. High beam return signals are processed by the high beam receiver 42 and the high beam signal processor 44. These paths operate similarly and are similarly implemented. Accordingly, only the low beam signal processing path is described. The low beam receiver 38 includes circuitry for pre-processing the low beam return signal. The low beam receiver 38 typically includes analog and digital circuitry, such as one or more filters, amplifiers, and mixers, and an analog to digital converter. These elements perform filtering, amplification, and down-conversion (i.e. demodulation to a lower frequency band) as is commonly known by those skilled in the art. Filtering removes extraneous unwanted signals in the return radar signals. In some cases, heterodyning can be used to demodulate the filtered data from the RF band to an IF band where analog to digital conversion can take place.

The low beam signal processor 40 then processes the pre-processed low beam return signal to detect any targets and determine the target's range $R_L$, amplitude $AMP_L$ and azimuth $AZI_L$. The high beam receiver 42 and the high beam signal processor 44 process high beam return signals in a similar fashion to detect targets and determine the target's range $R_H$, amplitude $AMP_H$ and azimuth $AZI_H$.

The low beam signal processor 40 is typically implemented using a digital signal processor, as can several other components of the radar system 10. Generally, the low beam signal processor 40 can perform demodulation to the baseband, low-pass filtering and downsampling. The low beam signal processor 40 can perform matched filtering by employing one or more matched filters that have a transfer function or impulse response that is matched to the transmitted radar pulses. The data from the matched filter(s) is then separated into CPIs for analysis in which the data is range-aligned and beamformed to provide the range-azimuth data. The range information in the range-azimuth data provides an estimate of a target's distance from the radar system 10. The azimuth information in the range-azimuth data provides an estimate of the angle of the target's location with respect to the center of the antenna 14. The low beam signal processor 40 then applies Doppler filtering to the range-azimuth data to produce range-Doppler-azimuth data. The Doppler information in the range-Doppler-azimuth data provides an estimate of a target's radial velocity by measuring the possible target's Doppler shift, which is related to the change in frequency content of a given radar pulse that is reflected by the target with respect to the original frequency content of the given radar pulse. Detection is also performed. The processing provided by the low and high beam signal processors 40 and 44 is described in more detail below with respect to FIG. 2.

The range, azimuth, and amplitude of targets detected by the low and high beam signal processors 40 and 44 are then provided to the PSR data processor 46. The PSR data processor 46 compares the targets detected by the high beam and the low beam to determine targets that are detected by both beams. If the PSR data processor 46 determines that a target is only detected in the low beam, then the PSR data processor 46 associates the range $R_L$, azimuth $AZI_L$ and a low beam indicator, such as 0 for example, to the detected target. If the PSR data processor 46 determines that a target is only detected in the high beam, the PSR data processor 46 associates the range $R_H$, azimuth $AZI_H$ and a high beam indicator, such as 1 for example, to the detected target. If the PSR data processor 46 determines that a target is detected in both the high and low beams, by finding a target for which $R_H$ is similar to $R_L$ and $AZI_H$ is similar to $AZI_L$, the PSR data processor 46 associates the range $R_H$ or $R_L$, azimuth $AZI_H$ or $AZI_L$, and the delta gain, calculated as per equation 1, to the detected target.

The PSR data processor 46 then estimates the delta gain for all targets that are detected in both the low and high beams. The PSR data processor 46 then estimates the height of the targets that are detected in both beams by using the azimuth and delta gain values as indices into the height-estimation lookup table 18 to obtain the corresponding elevation angle. The target's elevation angle can be found by searching the height estimation lookup table 18 for the range and azimuth values that are closest to the range and azimuth values of the target. Alternatively, a suitable interpolation algorithm can be applied to the elevation angles of the two closest pairs of range and azimuth values that correspond to the range and azimuth values of the target. The PSR data processor 46 then uses the looked-up elevation angle to calculate the sine (i.e. trigonometric function) of the elevation angle and multiply by the range of the target to estimate the height of the target. Alternatively, the height estimation lookup table 18 may include height values instead of elevation angles if the tangent operation is used on the range and azimuth values when the height estimation lookup table 18 is first created or calibrated, thereby saving the PSR data processor 46 from performing an extra calculation.

If the target is detected only in the high beam 100 or the low beam 102, then the PSR data processor 46 will not calculate the delta gain of the target and will note which beam the target was detected with. In this case the PSR data processor 46 can provide an indicator such as 0 and 1 as explained previously. For each detected target, the PSR data processor 46 can output the range, and azimuth, and either the estimated height or a beam indicator.

Wind turbines in general have a limited height, which can be approximately 100 meters on average. They also have very large radar cross sections, which guarantees strong low and high beam radar return signals that can result in detections in both the low and high beam signal processing paths. Accordingly, for cases in which there are detections in both beams, the height estimated by the PSR data processor 46 can result in temporarily labeling the detected target as a wind turbine if the estimated height is limited to several hundred meters. A height threshold can be specified but this depends on height estimation accuracy and the target range. Different height thresholds can be used for different ranges; for example, a smaller threshold can be use for near range targets and a larger threshold can be used for far-range targets. Alternatively, the height threshold can be pre-calculated for different wind farm regions based on the range azimuth gate map 48. Height thresholds can also be similarly specified and used to discriminate targets due to birds from targets due to aircrafts. The PSR data processor 46 can increase the confidence of the label by determining if the detection falls within the wind farm area according to the range azimuth gate map 48. The range azimuth gate map 48 is a map showing the location of known wind farms as well as other sources of clutter such as highways, the ocean, and the like. The map 48 can be a coarse map and can be updated when changes are made to the already known wind farms or if new wind farms are installed in the vicinity of the radar system 10.

Three conditions can be used to detect clutter due to a wind farm. The first two conditions can be assessed individually to determine if the detected target is due to wind clutter from a wind turbine. Alternatively, the third condition can be assessed along with either of the first and second conditions to increase the confidence of labeling a detected target as being due wind turbine clutter. Alternatively, all three of these conditions can be combined to obtain a greater level of confidence that the detected target is due to clutter from a wind turbine. A first condition is that there is a strong detection in both the low and high beam return signals for a target. The amplitude of the detected target can be compared to an amplitude threshold to determine if it is a strong detection indicative of wind farm clutter. A second condition is that the gain ratio of the low and high beam return signals for the possible target indicates an estimated elevation of less than about a few hundred meters (this depends on height estimation accuracy and the range of the wind farm with respect to the radar site as mentioned previously). A third condition is that the azimuth and range of the possible target correspond with the location of a wind farm as indicated by the range-azimuth gate map 48. Using dual beam operation and various combinations of these conditions, false detection due to wind turbines can be significantly suppressed. In addition, if the wind turbine clutter is detected in only one of the beams, the output of the same Doppler filter in the other beam can be checked to estimate a target height.

When it is determined that a detected target is actually clutter due to a wind farm, the PSR data processor 46 can provide clutter detection feedback signals to the low and high beam signal processors 40 and 44 to indicate a false detection. The low and high beam signal processors 40 and 44 can then remove the detected wind farm clutter from the detection results and determine whether there are any other targets in the current radar data that is being processed. This is explained in more detail with respect to FIG. 2. If another target is located in either of the low and high beam radar return data, then this information is provided to the PSR data processor 46 for processing once more. In another alternative, rather than removing the detected wind farm clutter from the detection results, the detected wind farm clutter and the corresponding low/high beam information can be provided to the plot extractor 22 and the tracker 24 to improve tracking performance (in this case, the detection results can still be reviewed in the PSR receiver 36 to determine if there are any aircraft or bird targets).

Another fact to consider is that when an aircraft flies near a wind farm area, typically the aircraft can only be detected in the high beam return radar signal. Under such circumstances, the probability of target detection for an aircraft target can be increased using dual beam operation by noting detections in the high beam return radar signal that are also in close proximity to a wind farm area by comparing the range and azimuth values for such detections with respect to the wind farm locations indicated by the range azimuth gate map 48. The use of SO-CFAR and individual clutter maps (described in more detail below) may also help in aircraft detection in this situation.

Figure 2:
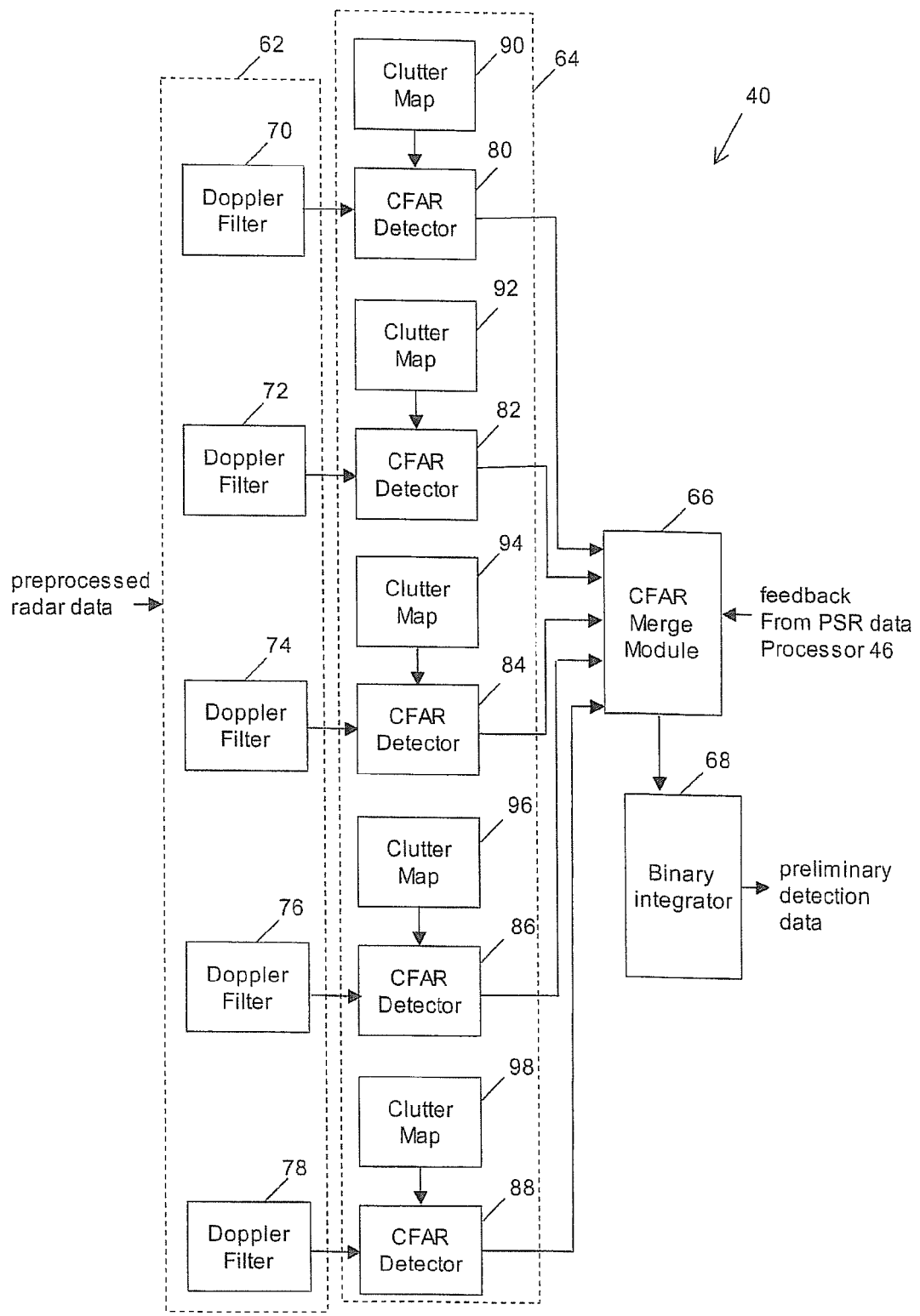
FIG. 2 is a block diagram of an exemplary embodiment of some components of a signal processor that can be used in the civil ATC radar system of FIG. 1.

Referring now to FIG. 2, shown therein is a block diagram of an exemplary embodiment of some components of the low beam signal processor 40 (a similar structure can be used for the high beam signal processor 44). The signal processor 40 includes a Doppler filter bank 62, a Constant False Alarm Rate (CFAR) detection module 64, a CFAR merge module 66 and a binary integrator 68. The binary integrator 68 can be optional. The Doppler filter bank 62 can include several Doppler filters and in this example includes five Doppler filters 70-78. The CFAR detection module 64 includes a corresponding number of CFAR detectors 80-88 which each use a clutter map 90-98. Those skilled in the art are familiar with the implementation of the Doppler filters 70-78, and CFAR schemes, other than those described, that may be used in detection.

In use, the Doppler filters 70-78 filter the preprocessed radar data provided by the low beam receiver 38 across Coherent Processing Intervals (CPIs) to provide several Doppler outputs that each include range-Doppler-azimuth data that can be used to separate moving targets from clutter. The Doppler information in the range-Doppler-azimuth data provides an estimate of a possible target's radial velocity by measuring the possible target's Doppler shift, which is related to the change in frequency content of a given radar pulse that is reflected by the possible target with respect to the original frequency content of the given radar pulse. The several Doppler outputs are processed on a range cell basis, i.e. the range-Doppler-azimuth cell for the current range cell that is being processed by the low beam signal processor 40. A range cell is a cell on a range-azimuth plot between certain azimuth and range values, for example i.e. between 0 and 5 degrees and 10 and 11 nautical miles.

In some embodiments, a detection threshold can be calculated as a function of the following three factors: 1) a CFAR threshold which is calculated based on a set of early range cells (i.e. early range cell window) before the current range cell being processed and a set of late range cells (i.e. late range cell window) after the current range cell being processed, by replacing excessively high amplitudes in each window with the average noise level in that window, averaging the amplitudes in both of the windows, and selecting the higher average; 2) a minimum threshold based on the target range; and 3) a clutter map output for zero-Doppler filter, scaled to the corresponding Doppler filter by applying weighting coefficients. This technique is referred to as a Greatest-OF (GO) CFAR method and the largest of the three thresholds is selected and an offset is added for false alarm control.

Alternatively, the detection method can be implemented as follows. The outputs of the Doppler filters 70-78 are processed by a corresponding one of the CFAR detectors 80-88 by processing either the power or the magnitude of the outputs of the Doppler filters 70-78. The CFAR detectors 80-88 select a threshold value based on a combination of radar amplitude data associated with the current range-azimuth cell that is being processed as well as the clutter level in a corresponding range cell provided by one of the corresponding clutter maps 90-98. Based on the dual beam and multiple clutter map operation, a CFAR technique referred to as the Smallest Of (SO)-CFAR method, along with peak editing, can be used to increase the sub-clutter target detection probability and super-clutter target detection probability. This CFAR method may not work as well in single beam and single clutter map operation due to the complex effects of wind turbines. Different types of CFAR methods can also be used.

In some embodiments, rather than using peak editing, the peaks can be replaced with an average value. For instance, assuming that there is a wind farm with wind turbines falling into several cells and the clutter-to-noise ratio (CNR) due to the wind turbines in each cell is about 60 dB. This is a typical number for the strong clutter return signals, which spreads over the entire dynamic range. In this case, the wind turbine return signals can raise the CFAR threshold to such a level that the aircraft in a range cell is lost and no detection is declared. This effect is called "detection shadowing". As confirmed in field tests, it can result in the loss of aircraft detection when the wind farms are located within +/−1 nautical mile from the aircraft's position. This can be fixed by substituting the amplitude level of the return signals in the range cells where anomalously high power is recorded with the average noise amplitude. If, in the example presented, the amplitude of the return signals in the several cells with wind turbine clutter are substituted with the average noise amplitude in all of the cells in the early and late range windows, the detection threshold can be brought back to a normal level in which detection of aircrafts is more probable (note rather than use amplitude, power can be used).

In another embodiment, the Cell Averaging (CA) CFAR technique can be used with peak editing in which the CFAR threshold is based on the early range and late range averages with the peak value edited (i.e. removed) from each of these averages. This avoids contamination from nearby targets in the estimation of a mean-level CFAR threshold.

In either case, the CFAR threshold is set to an initial value that is the smallest of these averages in the early and late range windows in order to detect aircraft targets (i.e. SO-CFAR). The threshold level is then compared to the clutter level in the corresponding range cell of the corresponding clutter map. The threshold value is set to the clutter level if the clutter level is larger than the initial value (this helps mitigate the effect of wind turbine clutter); otherwise, the threshold is set to the initial value. In either case an offset is added to the threshold level to control the level of false alarms.

Accordingly, the clutter maps 90-98 can help reduce false detections due to wind turbines. The clutter maps 90-98 can be created by smoothing the outputs of the corresponding Doppler filters 70-78 to estimate the average clutter for each range-azimuth cell. The clutter maps 90-98 can be updated from scan to scan. However, the clutter maps that include clutter due to wind turbines will have values that fluctuate more quickly than those of the clutter map used for the zero Doppler filter because this clutter is more stable and predictable. For the rest of the clutter maps associated with non-zero Doppler filters, the clutter may have higher dynamics and several scans will be required for any clutter activity to be thresholded out. Since targets of interest can also match the characteristics of the unwanted wind turbine radar return signals, the clutter maps corresponding to the CFAR detectors applied to the outputs of the non-zero Doppler filters can be applied selectively in range and azimuth such that real aircraft returns are not adversely affected. Specifically, aircraft on approach to an airport have to maintain a uniform speed and these airport approach patterns can rapidly integrate into any Doppler-based clutter map. This can be taken care of by how the CFAR threshold is calculated. In addition, the clutter map associated with the Doppler filter that typically detects birds can be updated differently to capture the change in clutter due to bird flight.

Accordingly, the clutter maps associated with the non-zero Doppler filters should be updated more quickly than the clutter map associated with the zero Doppler filter. If the clutter map associated with the zero Doppler filter is integrated or averaged over 16 scans, then the clutter maps associated with the non-zero Doppler filters can be integrated or averaged over 4 or 8 scans. In general, the clutter maps 90-98 employ an individual cell size of one range resolution cell by one beamwidth or less. Its overall coverage typically extends to full range and 360 degrees.

The clutter maps 90-98 will help suppress clutter with the following general characteristics: 1) clutter that is largely fixed in range and azimuth, 2) clutter that contains a fairly stable Doppler spectrum return, and 3) clutter that persists for a minimum period of time. Since all of these characteristics describe the radar returns from the wind turbines in the situations of variable wind intensity, the clutter maps 90-98 will be helpful to mitigate the effects of clutter due to wind farms.

The CFAR detectors 80-88 each provide a CFAR output. If a data set being processed by one of the CFAR detectors 80-88 exceeds the CFAR threshold for a given range cell, then the corresponding CFAR detector produces a CFAR alarm in its output. Each CFAR alarm can include information about the beam in which detection occurred in addition to current information about amplitude, range, and azimuth for the possible target as well as the number of the Doppler filter in which the detection occurred. The CFAR merge module 66 then selects the biggest target (i.e. the largest CFAR output) from those detected and indicated as such in the CFAR output data for the current range cell that is being processed.

The merged CFAR detections are further integrated by the binary integrator 68 to provide preliminary detection data that is sent to the PSR data processor 44. The binary integrator 68 integrates the largest CFAR outputs for m CPIs for a given range cell in a sliding window fashion. The binary integrator 68 can be, but is not limited, to a "2 out of 3" binary integrator. For example, a "3 out of 4" binary integrator can be used. For a "2 out of 3" binary integrator, the largest CFAR outputs must be associated with a detection for 2 out of 3 consecutive CPIs for the binary integrator 68 to declare a detected target. Accordingly, the binary integrator 68 correlates the detections from several consecutive CPIs to control false alarms due to clutter or second time around targets.

When the PSR data processor 46 determines that the possible detected target is actually clutter due to a wind turbine, it sends a clutter detection feedback signal to the CFAR merge module 66 to indicate a false detection. The CFAR merge module 66 then determines whether there is a second strongest detection. If there is a second strongest detection result, then the CFAR merge module 66 discards the strongest detection result and selects the second strongest detection result as a possible target detection. This operation will increase the probability of aircraft target detection in the vicinity of wind farms. However, if there isn't a second strongest detection, then the first strongest detection is retained and it is labeled as clutter due to a wind turbine. Alternatively, a detection due to wind turbine clutter and labeled as such can be retained and used in downstream radar processing modules or in radar reports.

Referring now to FIG. 5, shown therein is a flowchart diagram illustrating an exemplary embodiment of a radar data processing method 150 for mitigating the effects of wind turbines. The method 150 begins at step 152 at which point radar pulses are transmitted and then first and second sets of radar return signals (i.e. high and low beam radar return signals) are concurrently obtained for any reflections caused by objects in the radar surveillance region. The first and second set of radar return signals are then pre-processed as described previously. This can be done in step 152 or step 154. At step 154, detection is performed on the pre-processed high and low beam radar return signals to determine if there are any targets. Detection can be done in accordance with method 200 described in FIG. 6. At step 156, the detected targets are then further analyzed to determine if the detection is a false detection due to clutter from a wind turbine. This includes comparing the height of the target to a threshold of about several hundred meters, determining if there are strong amplitudes detected in both the low and high beams, and if the range and azimuth of the detected possible target coincide with the location of a wind farm that can be determined from a range azimuth gate map. The accuracy of the height estimation depends on the range of the target and so the height threshold can also change based on the target's range. For instance, with an accuracy of 0.5 degrees for the angle of elevation, the height accuracy is 87 meters for a target with a range of 10 km and 872 meters for a target with a range of 100 km. If the target is not due to clutter from a wind turbine, then the method 150 ends. Otherwise, if the target is due to clutter from a wind turbine, then the detection results are adjusted by determining if there are any other weaker target detections, which likely indicate an aircraft. In addition, at this point, the detection due to the wind turbine can be discarded or retained and labeled as a detection due to wind turbine clutter.

Referring now to FIG. 6, shown therein is a flowchart diagram illustrating a radar detection method 200 that can be employed by the radar data processing method 150 of FIG. 5. The method 200 starts at step 202 where Doppler processing is performed on a range cell by applying the Doppler filter bank 62. At step 204, for a given CFAR detector, the CFAR threshold is obtained based on the radar data. A cell averaging CFAR method can be used in which the values in the early and late range windows are averaged to get two average values. The smallest of these average values is used as an initial value for the CFAR threshold (i.e. according to SO-CFAR). This can be done after peak editing to remove strong return signal values in some of the cells in the early and late range windows. At step 206, the CFAR threshold may be updated based on the values in the clutter map that correspond to the given CFAR detector. If the clutter level of the clutter map at a range cell that corresponds to the current range cell that is being processed is larger than the initial value, then the CFAR threshold is set to the clutter level; otherwise the CFAR threshold is maintained as the initial value. In both cases, an offset is added to the CFAR threshold to control the false alarm rate. Alternatively, it may be possible to use other CFAR techniques.

At step 208, the clutter maps 90-98 of the CFAR detector bank 64 are updated by integrating over several scans as explained previously. The integration can be done in a quicker manner for the clutter maps that correspond to the CFAR detectors that process non-zero Doppler filter outputs. At step 210, CFAR detection is performed by comparing the amplitude in the range cell with the CFAR threshold. If the amplitude is larger than the CFAR threshold then there is a detection and a CFAR alarm is generated which includes the range, azimuth and Doppler values for the range cell, as well as the beam in which detection occurred. At step 212, all of the CFAR alarms are merged by retaining the CFAR alarm with the largest detected amplitude. Alternatively, the two CFAR alarms with the largest detections, if two exist, can be retained since the largest detection may be due to wind turbine clutter. At step 212, binary integration can also be performed.

The data combiner and calibrator 20 receives SSR detection information from the SSR 16 that includes the identity, range, azimuth, and height of aircraft with transponders that respond to the coded transmissions of the SSR 16. The data combiner and calibrator 20 also receives PSR detection information from the PSR 14 that includes the range, azimuth, and estimated height or beam indicator for possible targets detected with at least one of the high and low beams 100 and 102 from the PSR 14. The detection information from the PSR 14 can also include certain types of clutter such as that due to wind turbines or birds. Birds are similar to wind turbines and can be handled somewhat similarly. Birds are usually flying at a low altitude and slow speed. Both height estimation and clutter maps corresponding to low speed Doppler filter, can be incorporated into the processing methodology explained previously, to mitigate the effect of bird echoes. For instance, another height threshold may be used to discriminate targets due to birds from aircraft targets as is similarly done for wind turbine clutter. In addition, the clutter map in the CFAR detection module 64 that corresponds to the Doppler speed expected for birds can be updated at a rate commensurate to capture the change in clutter due to bird flying across the surveillance region. The data combiner and calibrator 20 then combines the information from the PSR 14 and the SSR 16 and can provide a combined report. The combined report is shorter than individual PSR and SSR reports when taken together. This optimizes communication with downstream radar modules since less data needs to be transmitted to these modules. For a given aircraft that responds to the polling by the SSR 16, the data combiner and calibrator 20 includes the range, azimuth, height and identity of the given aircraft in the combined report. For a given target that does not respond to the polling by the SSR 16, the data combiner and calibrator 20 includes the range, azimuth, and estimated height of the target provided by the PSR 14 in the combined report. If the estimated height is not available, then the data combiner and calibrator 20 provides a beam indication to indicate in which beam the target was detected. Also, the data combiner and calibrator 20 can indicate in the combined report if wind turbine or bird clutter has been detected by the PSR 14. Accordingly, the data combiner can further provide early warning of potential bird strike situations when the range, azimuth, height and trajectory of PSR only objects conflict with the known airport approach and departure paths. Correspondingly the unambiguous identification of the target's height from the PSR data can be used to eliminate it from being a threat to aircraft on approach and departure from airports.

Alternatively, the data combiner and calibrator 20 can still provide an SSR only report with range, azimuth, height and identity for aircraft with operational transponders. In another alternative, the data combiner and calibrator 20 can provide a PSR only report with the range, azimuth, and either the estimated height or the beam indicator for detected targets. The data combiner and calibrator 20 can also provide the combined, PSR-only or SSR-only data to a downstream radar elements for further processing as shown in FIG. 1. In each of these cases including the combined report, information on the predominant Doppler filter and beam detection can also be included (i.e. the Doppler filter output and the beam from which detection was based).

The plot extractor 22 receives information on targets and combines this information to form plots through a process known as plot extraction. The plot extractor 22 filters the targets to reject all of those targets that do not conform to the certain values that are expected for certain properties of a particular type of target such as, but not limited to, aircraft targets. Alternatively, the plot extractor 22 can retain non-aircraft targets, such as clutter due to bird migration or wind turbines, so that this clutter can be tracked. The plot extractor 22 can also be configured to determine the percentage of detections in a plot that occurred in a specific beam (i.e. low or high). This information is available for use at the measurement association and tracking stages to improve false target control by creating a new false target filter. Typically, low amplitude targets that have a majority of low beam detections might be considered to have a higher probability of being "false" while small targets that are largely derived from the high beam detections are more likely to be "real" (i.e. to be aircrafts).

The tracker 24 receives the plots and generates tracks by accounting for the temporal variation of measurement information for the detected targets for a sequence of plots. More specifically, the tracker 24 analyzes a sequence of plots and associates successive detections of a target to form a track for the target. An existing track is a record of successful association of plots over a number of scans. The associated plot data is smoothed and used to predict the flight path for plot correlation on succeeding scans and provides target speed and target heading. Accordingly, the tracker 24 determines the movement of the targets through a given surveillance area.

Figure 7:
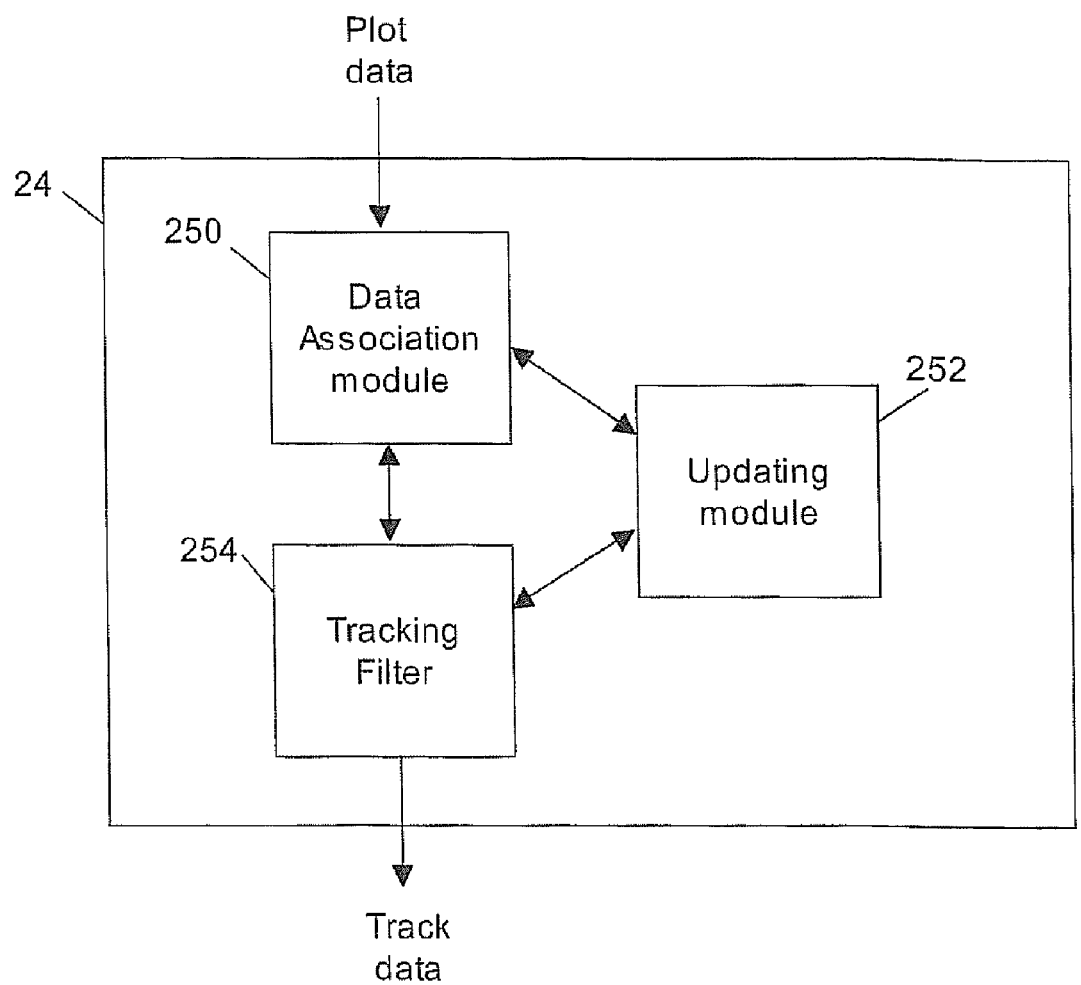
FIG. 7 is a block diagram of an exemplary embodiment of a tracker that can be used by the civil ATC radar system of FIG. 1.

Referring now to FIG. 7, shown therein is an exemplary block diagram of the tracker 24. The tracker 24 includes a data association module 250, an updating module 252 and a tracking filer 254. The data association module 250 can associate measurements to tracks based on the global nearest neighbour method. Feature aided tracking (FAT) and dense clutter tracking can also be used to improve the tracking data association performance. The FAT can be implemented through the aid of classification. The updating module 252 includes initial and updating inhibit filters (i.e. some inhibit filters are implemented). The tracking filter 254 can use Kalman filters. For instance, Multiple Model Kalman Filtering (MMKF) can be used since it provides even better performance for maneuvering targets than a single Kalman filter. A cost effective MMKF called the Interactive Multiple Model (IMM) method can also be used. Additional processing techniques such as adaptive logic, special track initialization and processing prioritization may also be used to help improve the tracking performance and decrease the false track in dense clutter environments like the wind farm regions.

The initial and updating inhibit filters used in the updating module 252 can be operated according to the following rules. If the initial and updating inhibit filters are enabled and a plot passed the inhibit rules, the plot is forbidden to initialize or associate with the tracks. If the "slow target filter" is enabled, a target is not reported when its track fails to meet the specific speed criteria. This feature is used to filter out slow-moving targets. Plots, which remain after the association attempt, are candidates to start new tracks. These new candidate tracks are dropped, if the plots fail to be associated with the next scan. A track which does not receive new updates (i.e. no plots are associated on the current scan) are coasted. A coasted track continues for a number of scans before it is dropped.

Feature aided tracking (FAT) involves the identification of existing and new features. New features are extracted by using feature extraction techniques. Features used in FAT can be based on target spatial information; it may be possible to use temporal correlation information. Typically, the features are extracted from a continuous string of signature signals from the same targets moving over time. A joint kinematic and feature exploitation is very useful for simultaneous tracking and identification or classification.

In feature aided tracking, the features are processed in a probabilistic way. The features are fed into the tracker 24 where data association weights are jointly determined by using this information. Typically, the track quality, which is the likelihood or likelihood ratio of the observations conditioned upon association hypotheses, can be used. Assuming that it is reasonably efficient, further reduction in the association error probability includes the introduction of additional information into the track quality. This additional information is embodied in quantities called track features which are included in the track quality. Track features such as amplitude, and frequency can also be incorporated into the likelihood function. Such a track classifier is described in Applicant's co-pending PCT patent application No. PCT/CA2006/000547 filed on Apr. 16, 2006 as well as the Applicant's US provisional patent application No. filed on Nov. 9, 2006.

The Global Nearest Neighbor (GNN) method provides better performance for multiple target tracking (MTT) in real-life stressful radar tracking environments. A test study showed that the GNN filter based on the Munkres method has good performance in terms of both tracking performance and robustness on real closely spaced maneuver radar data. Further tests showed that the two-dimensional Auction method is faster than the Munkres method. The two-dimensional Auction assignment method was sufficient for a dense civilian ATC space and it may also be applicable for the wind farm dense clutter environment.

Some additional processing techniques can be used to reduce the occurrence of false tracks or seduced tracks. Tracks can be categorized as potential, tentative, confirmed and deleted. A fixed track promotion logic may be used. For example, 2 plots can form a tentative track and if a tentative track missed plots in 3 consecutive scans, it can be deleted. Associated plots in 6 successive scans can be used to declare a confirmed track. If a confirmed track missed plots in 4 consecutive scans, it will be deleted. This is called logic 2-3-4-6 (for short as it is referred as 3-4-6 since the number "2" is never changed). When an adaptive promotion logic is utilized, the above numbers are adjusted accordingly and the false track rate can be decreased. The adaptation is based on the local or regional clutter density. In addition, in a dense clutter region, stricter gating and target motion dynamics can be used for track initialization in order to decrease overwhelming associations. An extreme situation is that no new tracks will be allowed in a very dense clutter region, where plots are used to be associated with confirmed tracks only. Furthermore, by giving a higher priority to longer and better quality tracks, a real target plot will not easily be used by a false track, even if the plot is closer to the false track (one plot is associated with one track). A track quality based tracker such as that described in the Applicant's co-pending U.S. patent application Ser. No. 11/756,913 filed on Jun. 1, 2007 can also be used.

The Kalman filter provides optimal tracking performance (measured in terms of mean-squared error) when the following conditions are met: 1) the state of the target evolves according to a known linear dynamic model driven by a single known input and additive zero-mean, white Gaussian noise with known covariance; and 2) the measurements are linear functions of the target state corrupted by additive zero-mean, white Gaussian noise with known covariance.

In many practical situations the targets being tracked undergo occasional maneuvers. Consequently, the motion of such targets cannot be modeled well via a single motion model. Hence, in order to achieve superior performance while estimating the state of a maneuvering target, it is essential that estimators use different state equations in different time intervals, that is, the target motion should be modeled as a stochastic hybrid system. The Multiple model (MM) or hybrid method can overcome this problem while yielding good noise reduction during the constant velocity portions of the trajectory. The MM method assumes the system to be one of a finite number of models (i.e. it is described by one of a finite number of models). The first order generalized pseudo-Bayesian (GPB1) MM algorithm computes the state estimate accounting for each possible current model. The second order generalized pseudo-Bayesian (GPB2) MM algorithm computes the state estimate accounting for each possible current model/each possible model at the previous time.

The Interacting multiple model (IMM) method computes the state estimate that accounts for each possible current model using a suitable mixing of the previous model-conditioned estimates depending on the current model. The IMM method performs significantly better than GPB1 and almost as well as GPB2 which is the most complex. The IMM method is considered to be a good compromise between complexity and performance. It has been shown to be very effective in many real time applications, with the applicability to track maneuvering as well as non-maneuvering targets using different filter models. The IMM method has been implemented to handle a large-scale air traffic control problem consisting of nearly a thousand targets. In a US benchmark problem designed to compare the performance of different algorithms for tracking highly maneuvering targets, the IMM method outperformed the Kalman filter and the $\alpha$-$\beta$ filter, with performance comparable to the much costlier Multiple Hypothesis Tracking (MHT) method. The IMM method achieves this by updating the mode probabilities based on the received data. It is this ensuing adaptive bandwidth capability, that is, the ability to switch between a high process noise (or alternatively, higher order or turn) model in the presence of maneuvers and a low process noise model in the absence of maneuvers, that gives the IMM method its advantage over simpler estimators like the Kalman filter and the $\alpha$-$\beta$ filter. The IMM method, when it relies mostly (with weight close to unity) on the nonmaneuver model, is a low bandwidth filter; when it relies mostly on the maneuver model it is a high bandwidth filter. Using a "soft switching" of these models, the IMM method accommodates both discrete and continuous uncertainties, making it ideally suited for tracking maneuvering targets which exhibit discrete motion uncertainties maneuver/nonmaneuver) as well as continuous ones (modeled by the process noise).

The classifier 26 receives the tracks generated by the tracker 24 and analyzes the tracks by measuring values for certain features of the tracks in order to classify the tracks as belonging to various different categories such as aircraft, birds, ground and weather clutter, environmental or geographical interference, etc. Another classifier may be trained for particular aircraft or non-aircraft targets and applied to the output of the classifier 26 to extract particular targets from aircraft or non-aircraft outputs. For instance, the non-aircraft class can be expanded to include birds, windmills, AP, etc.

The aircraft class can be expanded to include helicopters, UAV, light aircrafts, etc. Alternatively, the classifier 26 may be trained to identify each of these sub-classes of the aircraft and non-aircraft classes. An exemplary classifier is discussed in Applicant's co-pending PCT patent application No. PCT/CA2006/000547 filed on Apr. 16, 2006.

The classifier 26 can use a trained system for target track classification based on Support Vector Machines (SVM). Support Vector Machines are excellent learning techniques that can perform classification tasks by non-linearly mapping an n-dimensional input space into a high dimensional feature space. In this high dimensional feature space a linear classifier is constructed. The features that produce the n-dimensional input space play an important role in the success of any classifier. The individual features obtained from the raw radar track can be categorized into one of the following three types: 1) Flight path trajectory related features, 2) Radar cross section related features and 3) Velocity related features. Flight path trajectory related features consist of the reported range, azimuth and heading for each plot. Radar cross section related features are obtained from the mean and peak radar reflectivity values, and the number of detection points combined to form the resultant plots. The last category of features is velocity related and obtained from the reported speed of the target.

In order to increase the robustness of the classifier 26 in correctly identifying targets, confirmed track segments can be processed and classified. As such, the breadth of available features is increased and newly derived features can be obtained from the temporal interaction of plots within track segments. After evaluating a number of individual features using a Clustering Performance Index (CPI), a candidate list of features that can be used are listed in Table 1. The CPI quantifies the reparability of target class feature clusters, namely for the aircraft and non-aircraft classes.

TABLE 1

Summary of selected features as determined by analysis using the CPI on candidate features

| Feature | Name | Description |
| --- | --- | --- |
| $F_1$ | var_path | Variance in the displacement of path from a polynomial least-squares best-fit line |
| $F_2$ | var_delpth | Variance in the first difference of the displacement of path from a polynomial least-squares best-fit line |
| $f_3$ | var_delsl | Variance in the first difference of slope |
| $f_4$ | avg_path | Mean of the displacement of path from a polynomial least-squares best-fit line |
| $f_5$ | avg_delpth | Mean of the first difference of the displacement of path from a polynomial least-squares best-fit line |
| $f_6$ | avg_delsl | Mean of the first difference of slope |
| $f_7$ | var_del2spd | Variance in the second difference of speed (jerk) |
| $f_8$ | var_delspd | Variance in the first difference of speed (acceleration) |
| $f_9$ | sum_dist | Total of the distance covered by segment |
| $f_{10}$ | avg_del2spd | Mean of the second difference of speed (jerk) |
| $f_{11}$ | avg_delspd | Mean of the first difference of speed (acceleration) |
| $f_{12}$ | avg_spd | Mean of speed |
| $f_{13}$ | avg_scan | Average number of scans between successive plots |
| $f_{14}$ | avg_rng | Mean of range |
| $f_{15}$ | avg_ma | Mean of the mean amplitude of the plot |
| $f_{16}$ | avg_pa | Mean of the peak amplitude of the plot |
| $f_{17}$ | avg_pa-ma | Mean of the difference in peak and mean amplitudes of the plot |
| $f_{18}$ | avg_dts | Mean of the total number of detection in the plot |

By using track segments, the resulting increase in the recognition rate of the classifier 26 is made possible by sacrificing the availability of classification results during track formation. In effect, the classifier 26 requires a minimum number of associated plots before a decision is made. It should be noted that track formation generally occurs where clutter returns from other sources are limited. For instance, it is presumed that an aircraft track will typically not be initiated in a wind farm region. This assumption does not prevent such an event from occurring, however, the classifier 26 remains disabled until a minimum number of plots have been associated by the tracker 24. Once a minimum number of associated plots have been obtained, the classifier 26 becomes engaged for this track for the remainder of the tracking process until track termination.

The tracker 24 works by predicting the location of the next plot for an established track based on the kinematics of the previous plots. From this predicted position, a track-dependent window is established to attain candidate plots for the next association. In a typical setup, within the established window, the nearest neighbour to the predicted position is selected as the next associated plot. In the proposed system, the classifier 26 aids the tracker 24 in selecting the next candidate plot within this window. This is accomplished by augmenting the distance measure of each candidate plot based on its conformity to the track behaviour from the already established plot associations for the given track. The classifier 26 processes track segments, typically comprising of 5 associated plots, to obtain a feature point in the input space. Using the trained classifier, this point is tested to determine a class label for the target. The classes can be aircraft and non-aircraft targets. The non-aircraft class includes wind farm targets along with returns from other non-aircraft clutter (e.g. weather, anomalous propagation, etc.). As such, one-by-one, each candidate plot is sent to the classifier 26 along with the previous 4 associated plots (for a classifier processing segments of length 5). The resulting classification is compared to the behaviour of the established track and an appropriate adjustment is made to the distance of the candidate plot to the predicted position. For behaviour inline with that of the established track, the distance is reduced appropriately to reflect the level of conformity, whereas for non-conforming behaviour the distance is increased proportionally.

Generally, the radar system 10 can generate detection information based on the target detections in the first and second sets of radar return signals for a plurality of scans. The detection information can include the range, azimuth, amplitude, Doppler value, and estimated height or beam indicator for the targets detected by the PSR 14. Plots can then be generated based on this detection information for the plurality of scans. Alternatively, the plots can also be generated based on the detection information provided by the SSR 16, which includes the range, azimuth, amplitude, Doppler value, and height of aircraft that communicate with the SSR 16. The detection information from the PSR 14 and the SSR 16 can be merged by the data combiner and calibrator 20 and plots can be generated based on the merged information. Tracks of the detected targets can then be generated taking into account detection information related to the detected targets that are due to clutter. The tracks can then be classified by taking into account detection information related to the detected targets that are due to clutter. Further, it should be noted that in other embodiments different methods known to those skilled in the art may be used for the plot extractor 22, the tracker 24, and the classifier 26 that are suitable given the type of clutter described herein.

The output device 28 can provide information on the targets that are being detected, tracked and/or classified by the radar system 10. The output device 28 can be a monitor, a printer or other suitable output means. The output device 28 can receive classified tracks from the classifier 26 and provide output information on the classified tracks. In other embodiments, the output device 28 can receive information from other components of the radar system 10 and output this information.

The height estimation lookup table 18 provides calibrated elevation angles at a given resolution that correspond to an object's delta gain and azimuth for a given combination of high and low beam patterns. The resolution can be 0.1 dB but can vary from 0.01 dB to 1 dB. Accordingly, there can be many height-estimation tables depending on parametric values that are used for the high and low beam patterns. These parametric values include high beam pattern (i.e. cosecant, etc.), low beam pattern (i.e. cosecant, etc.), high beam gain, low beam gain, and the offset angle between the high and low beam patterns. As mentioned before, the height estimation table 18 may instead include height values if the tangent operation is used on the range and azimuth values when the height estimation lookup table 18 is first created or calibrated.

The values in the height estimation lookup table 18 can be initially determined using values provided by the PSR 14 and the SSR 16. The PSR 14 provides the delta gain for detected objects that correspond to aircraft in the surveillance area with transponders that respond to the polling of the SSR 16. The SSR 16 provides the range, azimuth, height and identity of these same aircraft. From the SSR range, and height, the elevation angle of the aircraft can be determined using the arctan trigonometric function, and this can be associated with the corresponding PSR delta gain value and used to build the height estimation lookup table 18. Accordingly, the civil ATC radar system merges the data provided by the PSR and SSR components to generate the lookup table 18. Merging this data in this fashion in a dynamic lookup table provides the ability to calculate the height of applicable PSR only traffic to a high degree of repeatability and accuracy. Furthermore, during operation, the data in the height estimation lookup table 18 can be continuously calibrated with the most current SSR data.

The SSR 16 transmits interrogation signals to, or polls, aircraft with transponders in the surveillance area. Upon receiving the interrogation signal, the transponder sends a coded reply signal back to the SSR 16. The coded reply signal typically includes information on the identity, range, azimuth, and height of the aircraft with respect to the SSR 16. The SSR 16 processes the coded reply signal to provide this information to the data combiner and calibrator 20.

The SSR 16 typically includes an SSR antenna 50, an SSR duplexer 52, an SSR transmitter 54, an SSR receiver 56, and an SSR signal processor 58. The control unit 12 controls the operation of the SSR 16 and can provide timing control signals to the SSR duplexer 52, the SSR transmitter 54, and the SSR receiver 56 to control the timing of the transmission and reception of signals. The SSR transmitter 54 can be configured to create the coded radar pulse signals that are to be transmitted and amplify these signals to a higher power level to provide adequate range coverage. The SSR antenna 50, SSR duplexer 52 and the SSR receiver 56 function similarly to the PSR receiver 36 and the PSR duplexer 32 with the exception that the SSR receiver 56 includes one processing path (i.e. the SSR receiver 56 and the SSR signal processor 58) and performs processing specific to the coded return signals provided by the transponders. These elements are well known to those skilled in the art.

The height estimation lookup table 18 can be periodically or continuously updated by the data combiner and calibrator 20 based on the PSR and SSR data for the beam patterns used for the high and low beams 100 and 102. If this dynamic calibration is not done, then the height estimation information would be based only on static calibration information which by nature can be vulnerable to several errors due to installation, component replacement/aging, the environment, and the like. Changes in the installation include the residual leveling of the PSR antenna 30 and the like, which can cause height estimation errors for certain areas of the surveillance area. Component replacement/aging involves component changes over time that creates errors for any calibration method that uses only initial calibration data. Environmental changes can cause radar beam bending that can result in height estimation errors. Accordingly, the radar system 10 periodically or continuously calibrates the data in the height estimation lookup table 18 to avoid these errors.

The height estimation lookup table 18 can be generated by using all combined reports that had a validated SSR altitude and a corresponding PSR unambiguous height estimation value. Multiple tables may be built in range or azimuth to cover any local geographic or system anomalies (e.g. four tables to cover quadrants 0-90, 90-180, 180-270 and 270-360 degrees). A fixed sample size (can be on the order of thousands such as 20,000) can be used. Calculated elevation angles values falling within the same resolution value (e.g. 0.1 dB) are averaged or the median obtained. The actual count of values used in each cells averaging is maintained to provide a "quality" assessment of the average provided. When generating the height estimation lookup table 18, each table entry value is compared to the table values on either side to ensure logical and reasonable progression of values in the table 18. Any "blank" table values can be assigned a value in the middle of the values on either side. The odds of "blank" values is statistically minimal as, in the example given, 20,000 samples are being applied to around 200 possible table entries.

The table generation process can be repeated on an on-going basis to provide a check of the accuracy of the values in the height estimation lookup table 18. A fixed sample size (e.g. 20,000) can be used to periodically (dependent on traffic activity) produce a new table for comparison with the current values in the height estimation lookup table 18. By comparing each value in the height estimation lookup table 18 to the newly generated table it will be possible to accumulate the deltas between the two and apply a warning to the radar operator when these accumulated errors exceed a threshold. At that point the operator will be allowed to use the new table if so required.

It should be noted that bird clutter can be handled somewhat similarly to wind turbine clutter as explained above. Accordingly, detections due to bird clutter can be handled in the same fashion as detections due to wind turbine clutter. For instance, detections due to bird clutter can be discarded or can be retained for use by radar processing elements downstream from the PSR 14. Also, when detections due to bird clutter are found, the clutter detection feedback signal can indicate this to at least one of the low and high beam signal processors 40 and 44 so that the next strongest target detection can be looked at to determine if they are an aircraft target.

It should also be noted that values for the various thresholds and parameters used in the various embodiments described herein can be affected by the location of the radar system 10. Accordingly, one method for determining values for these thresholds and parameters can be based on operating the radar system 10 based on real data, selecting various values for these parameters and thresholds and determining which values provide the best performance. In fact, it is well known to those skilled in the art that it is a well-known practice to routinely perform site optimization to select values for the thresholds and operating parameters.

It should also be noted that although the radar system 10 is described in terms of an ATC radar having a PSR and an SSR, the methodology and components described herein are also applicable to other radar systems that have a dual beam operation for which calibration data can be obtained.

The elements of the radar system 10 described herein may be implemented through any means known in the art such as dedicated hardware including a digital signal processor that executes computer instructions. Alternatively, discrete components such as filters, comparators, amplifiers, multipliers and the like may be used. Furthermore, the functionality of certain blocks may be provided by the same structure. If computer instructions are used, they may be written in Matlab, C, C++, Labview™ or any suitable programming language embodied in a computer readable medium on a computing platform having an operating system and the associated hardware and software that is necessary to implement the functionality of the radar system 10. The computer instructions can be organized into modules or classes, as is known to those skilled in the art, that are implemented and structured according to the structure of the radar system 10. In this case, if a DSP or other processor carries out the computer instructions, it can be considered to be circuitry operatively configured for carrying out at least some of the functionality of the radar system 10. Alternatively, a different structure may be used that can provide the same functionality. Some portions of the radar system 10 can also be implemented via FPGA or DSP-based firmware.

In one aspect, at least one embodiment described herein provides a method of processing radar data, the method comprising:

obtaining first and second sets of radar return signals concurrently;

detecting targets in the first and second sets of radar return signals; and identifying detected targets due to clutter.

The identifying step can comprise:

determining the detected targets common in both the first and second sets of radar return signals;

comparing amplitudes associated with the common detected targets to an amplitude threshold; and identifying the common detected targets with amplitudes greater than the amplitude threshold as potential detected targets due to wind turbine clutter.

The identifying step can further comprise:

estimating the height of the potential detected targets; and maintaining the potential detected targets having a height less than a height threshold as potential detected targets due to at least one of wind turbine clutter and bird clutter.

Alternatively, the identifying step can comprise:

determining the detected targets common in both the first and second sets of radar return signals;

estimating the height of the common detected targets; and identifying the common detected targets having heights less than a height threshold as potential detected targets due to at least one of wind turbine clutter and bird clutter.

The method can further comprise setting the height threshold as a function of the range of the potential detected targets based on height estimation accuracy.

The method can further comprise setting the height threshold differently based on wind turbine clutter and bird clutter.

In some cases, the identifying step can further comprise:

comparing range and azimuth values of the potential detected targets due to wind turbine clutter with a range gate azimuth map having known locations of wind turbines in the vicinity of the radar system; and maintaining the potential detected targets having range and azimuth values corresponding to a wind farm region as potential detected targets due to wind turbine clutter.

The method can further comprise adjusting the detection results based on the identified targets due to at least one of wind turbine clutter and bird clutter.

The method can further comprise repeating detection to determine other detected targets while taking into account the effect of the detection results of the identified targets due to at least one of wind clutter and bird clutter.

For detecting targets in a given set of radar return signals for a range cell, the method comprises:

pre-processing the given set of radar return signals;

performing Doppler processing on the pre-processed given set of radar return signals to produce several Doppler outputs;

performing CFAR detection on the several Doppler outputs to produce several CFAR detection results; and merging the CFAR detection results to obtain detection results for the range cell.

The method can further comprise applying binary integration to the merged CFAR detection results for several consecutive scans.

The method can further comprise generating a CFAR threshold for performing the CFAR detection for a given Doppler output by:

averaging values in an early range window prior to the range cell to obtain a first average;

averaging values in a late range window after the range cell to obtain a second average;

selecting the smaller of the first and second averages to produce an initial value;

determining a clutter level in a clutter map that corresponds to the range cell and the given Doppler output;

setting the CFAR threshold to the larger of the initial value and the clutter level; and adding a constant based on a desired false alarm rate to the CFAR threshold.

Performing CFAR detection for a given Doppler output can comprise generating a CFAR threshold based on a clutter map that corresponds to the given Doppler output, wherein the clutter map includes clutter information due to at least one of wind turbines and birds.

The method can include updating the clutter maps based on smoothed versions of the several Doppler outputs, wherein the several Doppler outputs corresponding to non-zero Doppler filters are smoothed based on a lower number of scans compared to one of the several Doppler outputs that corresponds to a zero Doppler filter.

The method can include updating the clutter maps based on smoothed versions of the several Doppler outputs, wherein the Doppler output corresponding to one of the Doppler filters having similar Doppler characteristics as birds are smoothed based on a number of scans sufficient to capture bird movement.

The method can include obtaining the first and second sets of radar return signals concurrently by generating a high beam pattern and a low beam pattern for receiving radar return signals, wherein the high and low beam patterns overlap with one another and produce a stable delta gain pattern.

The method can comprise generating the high and low beam patterns to produce the stable delta gain pattern with an overlap region that includes the angle of ascent and descent of an aircraft.

The method can comprise using a Primary Surveillance Radar (PSR) operatively configured to obtain the first and second sets of radar return signals concurrently, detect targets in the first and second sets of radar return signals, identify detected targets due to clutter, and generate first detection results.

The method can comprise using a Secondary Surveillance Radar (SSR) operatively configured to generate second detection results, and combining the first and second detection results to produce a combined report.

The first detection results can comprise the range, azimuth, amplitude and at least one of estimated height and a beam indication of the beam in which detection occurred for all targets detected by the PSR, and the second detection results can comprise the range, azimuth, amplitude and height of targets that communicate with the SSR.

The method can comprise:
  generating detection information based on the target detections in the first and second sets of radar return signals for a plurality of scans;
  generating plots based on the detection information for the plurality of scans; and
  generating tracks of the detected targets taking into account detection information related to the detected targets that are due to clutter.

The method can further comprise performing classification on the tracks taking into account detection information related to the detected targets that are due to clutter.

In another aspect, at least one embodiment described herein provides a computer readable medium for use in processing radar data. The computer readable medium comprises program code executable by a processor for implementing the method described above.

In another aspect, at least one embodiment described herein provides a radar system comprising hardware operatively configured to obtain first and second sets of radar return signals concurrently; first circuitry operatively configured to detect targets in the first and second sets of radar return signals; and second circuitry operatively configured to identify detected targets due to clutter.

The second circuitry is operatively configured to determine the detected targets common in both the first and second sets of radar return signals, and to compare amplitudes associated with the common detected targets to an amplitude threshold and identify the common detected targets with amplitudes greater than the amplitude threshold as potential detected targets due to wind turbine clutter and provide a clutter detection feedback signal to the first circuitry.

The second circuitry is operatively configured to estimate the height of the potential detected targets and maintain the potential detected targets having a height less than a height threshold as potential detected targets due to at least one of wind turbine clutter and bird clutter.

Alternatively, the second circuitry is operatively configured to determine the detected targets common in both the first and second sets of radar return signals, estimate the height of the common detected targets, and identify the common detected targets having heights less than a height threshold as potential detected targets due to at least one of wind turbine clutter and bird clutter and provide a clutter detection feedback signal to the first circuitry.

The height threshold can be a function of the range of the potential detected targets based on height estimation accuracy.

The height threshold can be set differently based on wind turbine clutter and bird clutter.

The second circuitry can be operative configured to compare range and azimuth values of the potential detected targets due to wind turbine clutter with a range gate azimuth map having known locations of wind turbines in the vicinity of the radar system, and maintain the potential detected targets having range and azimuth values corresponding to a wind farm region as potential detected targets due to wind turbine clutter.

The first and second circuitry can be operatively configured to adjust the detection results based on the identified targets due to at least one of wind turbine clutter and bird clutter.

The first circuitry can be operatively configured to repeat detection to determine other detected targets while taking into account the effect of the detection results of the identified targets due to at least one of wind clutter and bird clutter.

The first circuitry comprises a signal processing chain configured to detect targets in a given set of radar return signals. The signal processing chain comprises a beam receiver operatively configured to pre-process the given set of radar return signals; a Doppler filter bank operatively configured to perform Doppler processing on the pre-processed given set of radar return signals to produce several Doppler outputs; a CFAR detection module operatively configured to perform CFAR detection on the several Doppler outputs to produce several CFAR detection results; and a CFAR merge module operatively configured to merge the CFAR detection results to obtain detection results for the range cell.

The signal processing chain can further comprise a binary integrator operatively configured to process the merged CFAR detection results for several consecutive scans.

The CFAR detection module comprises a CFAR detector and a clutter map to process a given Doppler output, wherein the CFAR detector is operatively configured to average values in an early range window prior to the range cell to obtain a first average, average values in a late range window after the range cell to obtain a second average, select the smaller of the first and second averages to produce an initial value, determine a clutter level in the clutter map that corresponds to the range cell and the given Doppler output, set the CFAR threshold to the larger of the initial value and the clutter level; and add a constant based on a desired false alarm rate to the CFAR threshold.

The CFAR detection module comprises a CFAR detector and a clutter map to process a given Doppler output, and the CFAR detector is operatively configured to generate a CFAR threshold based on the clutter map, and the clutter map includes clutter information due to at least one of wind turbines and birds.

The clutter maps can be updated based on smoothed versions of the several Doppler outputs, wherein the several Doppler outputs corresponding to non-zero Doppler filters are smoothed based on a lower number of scans compared to one of the several Doppler outputs that corresponds to a zero Doppler filter.

The clutter maps can be updated based on smoothed versions of the several Doppler outputs, wherein the Doppler output corresponding to one of the Doppler filters having similar Doppler characteristics as birds are smoothed based on a number of scans sufficient to capture bird movement.

The hardware is operatively configured to generate a high beam pattern and a low beam pattern for receiving radar return signals to obtain the first and second sets of radar return signals concurrently, wherein the high and low beam patterns overlap with one another and produce a stable delta gain pattern.

The hardware is operatively configured to generate the high and low beam patterns to produce the stable delta gain pattern with an overlap region that includes the angle of ascent and descent of an aircraft.

The system can comprise a Primary Surveillance Radar (PSR) that provides the hardware, the first and the second circuitry and is operatively configured to generate first detection results.

The system can further comprise a Secondary Surveillance Radar (SSR) operatively configured to generate second detection results, and a data combiner and calibrator operatively configured to combine the first and second detection results to produce a combined report.

The first detection results can comprise the range, azimuth, amplitude and at least one of estimated height and a beam indication of the beam in which detection occurred for all targets detected by the PSR, and the second detection results can comprise the range, azimuth, amplitude and height of targets that communicate with the SSR The system can comprise a data combiner and calibrator operatively configured to generate detection information based on the target detections in the first and second sets of radar return signals for a plurality of scans; a plot extractor operatively configured to generate plots based on the detection information for the plurality of scans; and a tracker operatively configured to generate tracks of the detected targets taking into account detection information related to the detected targets that are due to clutter.

The system can further comprise a classifier operatively configured to perform classification on the tracks taking into account detection information related to the detected targets that are due to clutter.

While certain features have been illustrated and described for the various embodiments discussed herein, modifications, substitutions, changes, and equivalents can be made, without departing from the scope of these embodiments as defined in the appended claims.

The invention claimed is:

1. A method of processing radar data, the method comprising:
   obtaining first and second sets of radar return signals concurrently; detecting targets in the first and second sets of radar return signals; and
   identifying detected targets due to clutter by:
      determining the detected targets common in both the first and second sets of radar return signals;
      comparing amplitudes associated with the common detected targets to an amplitude threshold; and
      identifying the common detected targets with amplitudes greater than the amplitude threshold as potential detected targets due to round-based clutter.

2. The method of claim 1, wherein the identifying step further comprises:
   estimating the height of the potential detected targets; and
   maintaining the potential detected targets having a height less than a height threshold as potential detected targets due to ground-based clutter.

3. The method of claim 2, wherein the method further comprises setting the height threshold as a function of the range of the potential detected targets based on height estimation accuracy.

4. The method of claim 2, wherein the method further comprises setting the height threshold differently based on different types of ground-based clutter.

5. The method of claim 2, wherein the identifying step further comprises:
   comparing range and azimuth values of the potential detected targets due to wind turbine clutter with a range gate azimuth map having known locations of wind turbines in the vicinity of the radar system; and
   maintaining the potential detected targets having range and azimuth values corresponding to a wind farm region as potential detected targets due to wind turbine clutter.

6. The method of claim 1, wherein the method further comprises adjusting detection results by determining it there are any other weaker target detections when the identified targets are due to at least one of wind turbine clutter and bird clutter.

7. The method of claim 1, wherein the method further comprises repeating detection to determine other detected targets while taking into account the effect of the detection results of the identified targets due to wind turbine clutter by discarding a strongest detection result and selecting a second strongest detection result as a possible target detection.

8. The method of claim 1, wherein detecting targets in a given set of radar return signals for a range cell comprises:
   pre-processing the given set of radar return signals;
   performing Doppler processing on the pre-processed given set of radar return signals to produce several Doppler outputs;
   performing CFAR detection on the several Doppler outputs to produce several CFAR detection results; and
   merging the CFAR detection results to obtain detection results for the range cell.

9. The method of claim 8, wherein the method further comprises applying binary integration to the merged CFAR detection results for several consecutive scans.

10. The method of claim 8, wherein the method further comprises generating a CFAR threshold for performing the CFAR detection for a given Doppler output by:
    averaging values in an early range window prior to the range cell to obtain a first average;
    averaging values in a late range window after the range cell to obtain a second average;
    selecting the smaller of the first and second averages to produce an initial value;
    determining a clutter level in a clutter map that corresponds to the range cell and the given Doppler output;
    setting the CFAR threshold to the larger of the initial value and the clutter level; and
    adding a constant based on a desired false alarm rate to the CFAR threshold.

11. A computer readable medium for use in processing radar data, the computer readable medium having stored thereon program code executable by a processor, the program code for implementing a method comprising:
    concurrently obtaining first and second sets of radar return signals;
    concurrently processing the radar return signals in high and low beam reception channels by beamforming receive beams to high and low directions to detect targets in the first and second sets of radar return signals; and
    identifying detected targets due to clutter by:
       determining the detected targets common in both the first and second sets of radar return signals;
       estimating the height of the common detected targets; and
       identifying the common detected targets having heights less than a height threshold.

12. A radar system comprising:
    hardware operatively configured to obtain first and second sets of radar return signals concurrently;
    first circuitry operatively configured to detect targets in the first and second sets of radar return signals; and second circuitry operatively configured to identify detected targets due to clutter by determining the detected targets common in both the first and second sets of radar return signals, comparing amplitudes associated with the common detected targets to an amplitude threshold and identifying the common detected targets with amplitudes greater than the amplitude threshold as potential detected targets due to around-based clutter.

13. The system of claim 12, wherein the second circuitry is operatively configured to estimate the height of the potential detected targets and maintain the potential detected targets having a height less than a height threshold as potential detected targets due to ground-based clutter.

14. The system of claim 13, wherein the height threshold is a function of the range of the potential detected targets based on height estimation accuracy.

15. The system of claim 13, wherein the height threshold is set differently based on different types of ground-based clutter.

16. The system of claim 13, wherein the second circuitry is operative configured to compare range and azimuth values of the potential detected targets due to wind turbine clutter with a range gate azimuth map having known locations of wind turbines in the vicinity of the radar system, and maintain the potential detected targets having range and azimuth values corresponding to a wind farm region as potential detected targets due to wind turbine clutter.

17. The system of claim 12, wherein the first and second circuitry are operatively configured to adjust detection results by determining if there are any other weaker target detections when the identified targets are due to at least one of wind turbine clutter or bird clutter.

18. The system of claim 12, wherein the first circuitry is operatively configured to repeat detection to determine other detected targets while taking into account the effect of the detection results of the identified targets due to wind turbine clutter by discarding a strongest detection result and selecting a second strongest detection result as a possible target detection.

19. The system of claim 12, wherein the first circuitry comprises a signal processing chain configured to detect targets in a given set of radar return signals, wherein the signal processing chain comprises:
   a beam receiver operatively configured to pre-process the given set of radar return signals;
   a Doppler filter bank operatively configured to perform Doppler processing on the pre-processed given set of radar return signals to produce several Doppler outputs;
   a CFAR detection module operatively configured to perform CFAR detection on the several Doppler outputs to produce several CFAR detection results; and
   a CFAR merge module operatively configured to merge the CFAR detection results to obtain detection results for the range cell.

20. A computer readable medium for use in processing radar data, the computer readable medium having stored thereon program code executable by a processor, the program code for implementing a method comprising:
   concurrently obtaining first and second sets of radar return signals;
   concurrently processing the radar return signals in high and low beam reception channels by beamforming receive beams to high and low directions to detect targets in the first and second sets of radar return signals; and
   identifying detected targets due to clutter by:
      determining the detected targets common in both the first and second sets of radar return signals;
      comparing amplitudes associated with the common detected targets to an amplitude threshold; and
      identifying the common detected targets with amplitudes greater than the amplitude threshold as potential targets due to ground-based clutter.

21. A method of processing radar data, the method comprising:
   obtaining first and second sets of radar return signals concurrently; detecting targets in the first and second sets of radar return signals; and
   identifying detected targets due to clutter by:
      determining the detected targets common in both the first and second sets of radar return signals;
      estimating the height of the common detected targets; and
      identifying the common detected targets having heights less than a height threshold as potential detected targets due to at least one of wind turbine clutter and bird clutter.

22. The method of claim 21, wherein the method further comprises setting the height threshold as a function of the range of the potential detected targets based on height estimation accuracy.

23. The method of claim 21, wherein the method further comprises setting the height threshold differently based different types of ground-based clutter.

24. The method of claim 21, wherein the identifying step further comprises:
   comparing range and azimuth values of the potential detected targets due to wind turbine clutter with a range gate azimuth map having known locations of wind turbines in the vicinity of the radar system; and
   maintaining the potential detected targets having range and azimuth values corresponding to a wind farm region as potential detected targets due to wind turbine clutter.

25. A radar system comprising:
   hardware operatively configured to obtain first and second sets of radar return signals concurrently;
   first circuitry operatively configured to detect targets in the first and second sets of radar return signals; and
   second circuitry operatively configured to identify detected targets due to clutter by determining the detected targets common in both the first and second sets of radar return signals, estimating the height of the common detected targets, and identifying the common detected targets having heights less than a height threshold as potential detected targets due to ground-based clutter.

26. The system of claim 25, wherein the height threshold is a function of the range of the potential detected targets based on height estimation accuracy.

27. The system of claim 25, wherein the height threshold is set differently based on wind turbine clutter and bird clutter.

28. The system of claim 25, wherein the second circuitry is operatively configured to compare range and azimuth values of the potential detected targets due to wind turbine clutter with a range gate azimuth map having known locations of wind turbines in the vicinity of the radar system, and maintain the potential detected targets having range and azimuth values corresponding to a wind farm region as potential detected targets due to wind turbine clutter.

* * * * *

UNITED STATES PATENT AND TRADEMARK OFFICE
CERTIFICATE OF CORRECTION

| | | |
|---|---|---|
| PATENT NO. | : 7,675,458 B2 | Page 1 of 1 |
| APPLICATION NO. | : 11/760188 | |
| DATED | : March 9, 2010 | |
| INVENTOR(S) | : Oliver Hugh Hubbard et al. | |

It is certified that error appears in the above-identified patent and that said Letters Patent is hereby corrected as shown below:

Column 10, line 16 delete "use" and replace with --used--.

Column 10, line 37 after "due" insert --to--.

Column 15, line 35 delete "bird" and replace with --birds--.

Column 16, line 2 delete "a".

Column 17, line 28 delete "No. filed" and replace with --No. 60/857,784 filed--.

Column 18, line 56 delete "maneuver/" and replace with --(maneuver/--.

Column 22, line 24 delete "angles" and replace with --angle--.

Column 22, line 26 delete "cells" and replace with --cell's--.

Column 26, line 1 delete "operative" and replace with --operatively--.

Column 27, line 17 delete "SSR" and replace with --SSR.--.

Column 27, line 50 delete "round-" and replace with --ground- --.

Column 28, line 7 delete "it" and replace with --if--.

Column 30, line 27 after "based" insert --on--.

Signed and Sealed this

Twenty-fifth Day of May, 2010

David J. Kappos
*Director of the United States Patent and Trademark Office*